United States Patent
Lee et al.

(10) Patent No.: US 7,925,518 B2
(45) Date of Patent: Apr. 12, 2011

(54) SYSTEM AND METHOD FOR PAYMENT OF MEDICAL CLAIMS

(75) Inventors: Ernest Lee, Lafayette, CA (US); Jack LaBounty, Bellevue, WA (US); Stephen Barchet, Issaquah, WA (US)

(73) Assignee: Visa U.S.A. Inc., San Francisco, CA (US)

( * ) Notice: Subject to any disclaimer, the term of this patent is extended or adjusted under 35 U.S.C. 154(b) by 2489 days.

(21) Appl. No.: 10/418,989

(22) Filed: Apr. 18, 2003

(65) Prior Publication Data
US 2003/0200118 A1 Oct. 23, 2003

Related U.S. Application Data

(60) Provisional application No. 60/373,903, filed on Apr. 19, 2002.

(51) Int. Cl.
*G06Q 10/00* (2006.01)
(52) U.S. Cl. .................. 705/2; 705/3; 705/4
(58) Field of Classification Search .......... 705/2, 3, 705/4
See application file for complete search history.

(56) References Cited

U.S. PATENT DOCUMENTS

| | | | |
|---|---|---|---|
| 5,018,067 A * | 5/1991 | Mohlenbrock et al. ....... 600/300 |
| 5,175,416 A * | 12/1992 | Mansvelt et al. .............. 235/379 |
| 5,235,507 A | 8/1993 | Sackler et al. |
| 5,301,105 A | 4/1994 | Cummings, Jr. |
| 5,324,077 A | 6/1994 | Kessler et al. |
| 5,965,860 A | 10/1999 | Oneda |
| 6,012,035 A | 1/2000 | Freeman, Jr. et al. |
| 6,208,973 B1 | 3/2001 | Boyer et al. |
| 6,343,271 B1* | 1/2002 | Peterson et al. ................... 705/4 |
| 6,850,901 B1 | 2/2005 | Hunter et al. |
| 6,915,265 B1 | 7/2005 | Johnson |
| 7,072,842 B2 | 7/2006 | Provost et al. |
| 7,174,302 B2* | 2/2007 | Patricelli et al. .................. 705/4 |
| 2001/0037295 A1 | 11/2001 | Olsen |
| 2002/0002536 A1 | 1/2002 | Braco |
| 2002/0019808 A1 | 2/2002 | Sharma |
| 2002/0147678 A1* | 10/2002 | Drunsic .......................... 705/39 |
| 2002/0152180 A1 | 10/2002 | Turgeon |
| 2003/0200118 A1 | 10/2003 | Lee et al. |
| 2004/0111345 A1 | 6/2004 | Chuang et al. |
| 2004/0210520 A1 | 10/2004 | Fitzgerald et al. |
| 2005/0211764 A1 | 9/2005 | Barcelou |
| 2005/0288964 A1 | 12/2005 | Lutzen et al. |

* cited by examiner

*Primary Examiner* — Jerry O'Connor
*Assistant Examiner* — Lena Najarian
(74) *Attorney, Agent, or Firm* — Chadbourne & Parke LLP; Walter G. Hanchuk

(57) ABSTRACT

A system allows a health care provider to arrange payment at the time of service for a patient responsibility portion of a health care claim amount, even though the provider may not know what the patient responsibility portion will be until after adjudication. A health care debit card is associated with an account of the patient. At the time of service, the patient presents the card to the provider. The provider uses the card to authorize the system to hold an estimate of the patient responsibility amount in suspense in the patient's account. After adjudication, when the actual patient responsibility amount is known, a transaction set is sent to the system. The system then automatically transfers the actual patient responsibility amount from the patient's account and into the provider's bank account. Any remainder of the suspended funds is left in the patient's account. A trace number is provided so that the provider can reconcile bank statement deposits with transaction set information.

10 Claims, 18 Drawing Sheets

Definition of Terms

| | |
|---|---|
| 835 | The set of segments beginning with the "ST" segment and ending with the "SE" segment. There can be many 835s within a Transmission. <u>Unique Key</u>: Retrieval Reference Number (TPN03) |
| 997/998 | An Interchange Acknowledgement file comprised of 997 segments and 998 segments that feeds back information to the sender of a Transmission. |
| Anonymous User | An internet user who accesses www.tpnhpay.com. |
| Authentication | The process of allowing an online user access to primary point of entry for Members. |
| Authorization | The process of allowing a previously authenticated user to perform certain and specific hPay functions. |
| Customer Service Representative (CSR) | A TPN representative who is authenticated and who is authorized to perform certain back-office administrative functions within the TPN hPay Solution System. |
| EFT | An electronic funds transfer. Unique Key: Subset of (Trace) Reference Identification (TRN02). |
| Master CSR | A TPN representative who is authenticated, who has authority to grant CSR privileges and who, himself, is authorized to perform all back-office administrative functions within the TPN hPay System. |
| Master Payer User | Per Payer Member, the single user who is authenticated, who has authority to grant Payer User privileges and who, himself, has been granted master privileges to all functions of a single Payer by the TPN Customer Service team. |

FIG. 5A

| | |
|---|---|
| Master Provider User | Per Provider Member, the single user who is authenticated, who has authority to grant Provider User privileges and who, himself, has been granted master privileges to all functions of a single Provider by the TPN Customer Service team |
| Payer | A health care plan. |
| Payer Member | A Payer that is a member of the TPN hPay System and that makes payments for health care claims through the VISA DPS ePay System. A Payer Member is composed of 1 or more Payer Identifiers. |
| Payer User | An internet user who is authenticated and who has been granted user privileges to certain functions of one or more Payer Members. |
| Processor | The computer that creates and transmits Transmissions for a Payer Member. Unique Key: "Institution ID of the sender" (ISA06) |
| Provider | A health care provider. |
| Provider Member | A Provider who is a member of the TPN hPay System, who submits health care claims for payment and who receives payment from the VISA DPS ePay System. A Provider Member is composed of one or more Provider Identifiers. Unique Key: Federal Tax ID (N104) |
| Provider User | An internet user who is authenticated and who has been granted user privileges to certain functions of one or more Provider Members. |
| Reject | The refusal or inability of the VISA DPS ePay System to process a Transmission or an 835 because of structural or content problems within or between segments or fields. |

FIG. 5B

| Return | The refusal or inability of a bank to deposit funds into a Provider Member's bank account. |
|---|---|
| Settlement Day | A VISA DPS definition, the period from 3:00:01 PM MST to 3:00:00 PM MST the following day.TransmissionThe set of segments beginning with the "ISA" segment and ending with the "IEA" segment. Also known as a File. Unique Key: Interchange Sender Identification (ISA06) plus Interchange Control Number (ISA13) |

FIG. 5C

TPN Cross-Functional Process Map

Money Movement Process

TPN Cross-Functional Process Map

Return Processing Sub-Process

TPN Cross-Functional Process Map

Fee File Handling Sub-Process

| | | |
|---|---|---|
| Health Care Provider | | |
| Health Care Payer | | |
| TPN hPay | Receive & Process Fee File | |
| VISA DPS ePay | Update & Send Fee File | |
| Payer's Settlement Account | | |
| Provider's Bank | | |

FIG. 16

TPN Cross-Functional Process Map

Provider Member Enrollment Process

| | | | | | | | |
|---|---|---|---|---|---|---|---|
| Health Care Provider | Inquire About TPN | ePay Bank? | Enroll In hPay | | | | Train Staff |
| Health Care Payer | | | | | | | |
| TPN hPay | Tell Provider About TPN | Offer List Of ePay Banks | Establish Membership | Confirm Bank Info | Send Provider Profile | Authorize & Enable Production Processing | |
| VISA DPS ePay | | | | | Process Provider Profile | | |
| Payer's Settlement Account | | | | | | | |
| Provider's Bank | | | | Confirm Account Info | | | |

FIG. 17

TPN DATA RELATIONSHIP DIAGRAM

| | Entity | Relationship | | Entity |
|---|---|---|---|---|
| One | Patient | Receives care from | Many | Provider Members |
| One | Provider Member | Provides care to | Many | Patients |
| One | Provider Member | Aujthorizes | One | Provider Master User |
| One | Provider MasterUser | Can access | Many | Provider Members |
| One | Provider Member | Authorizes | Many | Provider Users |
| One | Provider user | Can access | Many | Provider Members |
| One | Provider Member | Submits claims to | Many | Payer Member |
| One | Payer Member | Approves payment to | Many | Provider Members |
| One | Payer Member | Authorizes | One | Payer Master User |
| One | Payer Master User | Can access | Many | Payer Members |
| One | Payer Member | Authorizes | Many | Payer Users |
| One | Payer User | Can access | Many | Payer Members |
| One | Payer Member | Sends Transmissions via | One | Processor |
| One | Processor | Sends Transmissions for | Many | Payer Member |
| One | Processor | Sends | Many | Original Transmission |
| One | Original Transmission | Came from | One | Processor |
| One | Original Transmission | Generates | One | 997/998 |
| One | 997/998 | Acknowledges | One | Original Transmission |
| One | Original Transmission | Comprises | Many | 835s |
| One | 835 | Is contained within | One | Original Transmission |
| One | 835 | Contains payments for | One | Provider Member |
| One | Provider Member | Gets payment from | Many | 835s |
| One | 835 | Contains payments from | One | Payer Member |
| One | Payer Member | Gets payments from | Many | 835s |
| One | 835 | Contains | Many | Claim Payments |
| One | Claim Payment | Originated in | One | 835 |
| One | Original Transmission | Results in | One | Updated Transmission |
| One | Updated Transmission | Originated from | One | Original Transmission |
| One | Updated Transmission | Gets paid by | One | Wire Event |
| One | Wire Event | Pays for | Many | Updated Transmissions |
| One | Updated Transmission | Is effected by | Many | Non-wire Events |
| One | Non-wire Event | Affects the state of | One | Updated Transmission |
| One | 835 | Creates | One | EFT Credit |
| One | EFT Credit | Originates from | One | 835 |
| One | EFT Credit | Can generate | One | Return |
| One | Return | Results from | One | EFT Credit |

FIG. 25

SYSTEM AND METHOD FOR PAYMENT OF MEDICAL CLAIMS

CROSS-REFERENCE TO RELATED APPLICATION

This application claims the benefit under 35 U.S.C. §119 (e) of U.S. Provisional Application No. 60/373,903, filed Apr. 19, 2002. The entirety of the subject matter of U.S. Provisional Application No. 60/373,903 is incorporated herein by reference.

BACKGROUND INFORMATION

Currently a health care provider (for example, a doctor) does not know at the time of service what portion of the doctor's bill for services will be the patient's responsibility and what portion will be paid by a payer (for example, an insurance company). Only after the patient's visit is the patient responsibility amount determined. This patient responsibility amount is determined by the doctor and the payer in what is called an "adjudication". This means that the doctor typically cannot bill the patient at the time of service, but rather must wait until the amount is known to bill the patient for the patient responsibility amount. The result is paperwork, administrative expense, and a delay in collection. If the patient later chooses not to pay, the expense to the doctor of collecting payment from the patient may be so great that the doctor elects just to write off the uncollected amount. A solution is desired.

SUMMARY

A system and method for the payment of health care claim amounts is provided. The system allows a health care provider (for example, a doctor) to arrange payment at the time of service for a patient responsibility portion of the total health care claim amount, even though the provider may not know what the patient responsibility amount will be until after adjudication.

In accordance with one embodiment, a health care debit card is provided. The health care debit card is associated with a designated account (or accounts) of the patient. This designated account may, for example, be a spending account of a defined benefit health care plan.

At the time of service, the patient presents the card in order to arrange for payment of the patient responsibility portion of the health care service provided or to be provided. The provider supplies an estimate of the patient responsibility amount to the system and the patient's health care debit card is used to authorize the system to hold the estimated amount in suspense in the designated account of the patient. After service has been rendered, the provider submits a claim to a payer (for example, the patient's health insurance company) for payment. After adjudication, the payer transmits a transaction set to the system. The transaction set indicates, among other things, the actual patient responsibility amount and a payer's amount. The payer's amount is the amount to be paid by the payer.

Using this transaction set information, the system automatically transfers the actual patient responsibility amount from the suspended funds and into the provider's bank account. Any remainder of the suspended funds are left in the patient's account. It is therefore seen that payment was received from the patient without the doctor having to undertake a second billing after the time of service had passed.

The system also uses the transaction set information to transfer automatically the payer amount (amount to be paid by the patient's health insurance company) from the payer's bank account, through a settlement bank, and into the provider's bank account.

The system involves a server that supplies the transaction set information about the payment of the claim to the provider. In one embodiment, the server is a web site server that supplies a web site to the provider. The provider can access the web site and determine, for each claim, the payer amount paid by the payer and the actual patient responsibility amount paid by the patient.

For each amount deposited into the provider's bank account, the system also supplies to the provider's bank an associated trace number. The provider's bank in turn forwards this trace number to the provider along with a record of the associated deposit amount. The provider can then use the trace number to associate transaction set information received for a given claim with a record from the provider's bank of a particular deposited amount. In this way, a provider can confirm that a particular payment amount indicated by the transaction set information to have been paid was in fact paid as evidenced by a particular deposit amount appearing on a deposit statement from the provider's bank.

BRIEF DESCRIPTION OF THE DRAWINGS

The present invention is illustrated by way of example and not limitation in the figures of the accompanying drawings, in which:

FIGS. 5A, 5B, 5C, and 6-25 are diagrams associated with the "FUNCTIONAL SPECIFICATION" portion of this patent document.

DETAILED DESCRIPTION

The entire document entitled "Payer Health Care Financial Advice (835) Transaction Set Technical Interface Manual V1.0" is part of the present patent document by virtue of its being a part of U.S. Provisional Application No. 60/373,903 (the contents of which are incorporated herein by reference).

The entire document entitled "Software Specifications (Functional Specifications v3.2) Transaction Payment Network, LLC, nPay System Developments" is part of the present patent document by virtue of its being a part of U.S. Provisional Application No. 60/373,903 (the contents of which are incorporated herein by reference).

Figure 1:
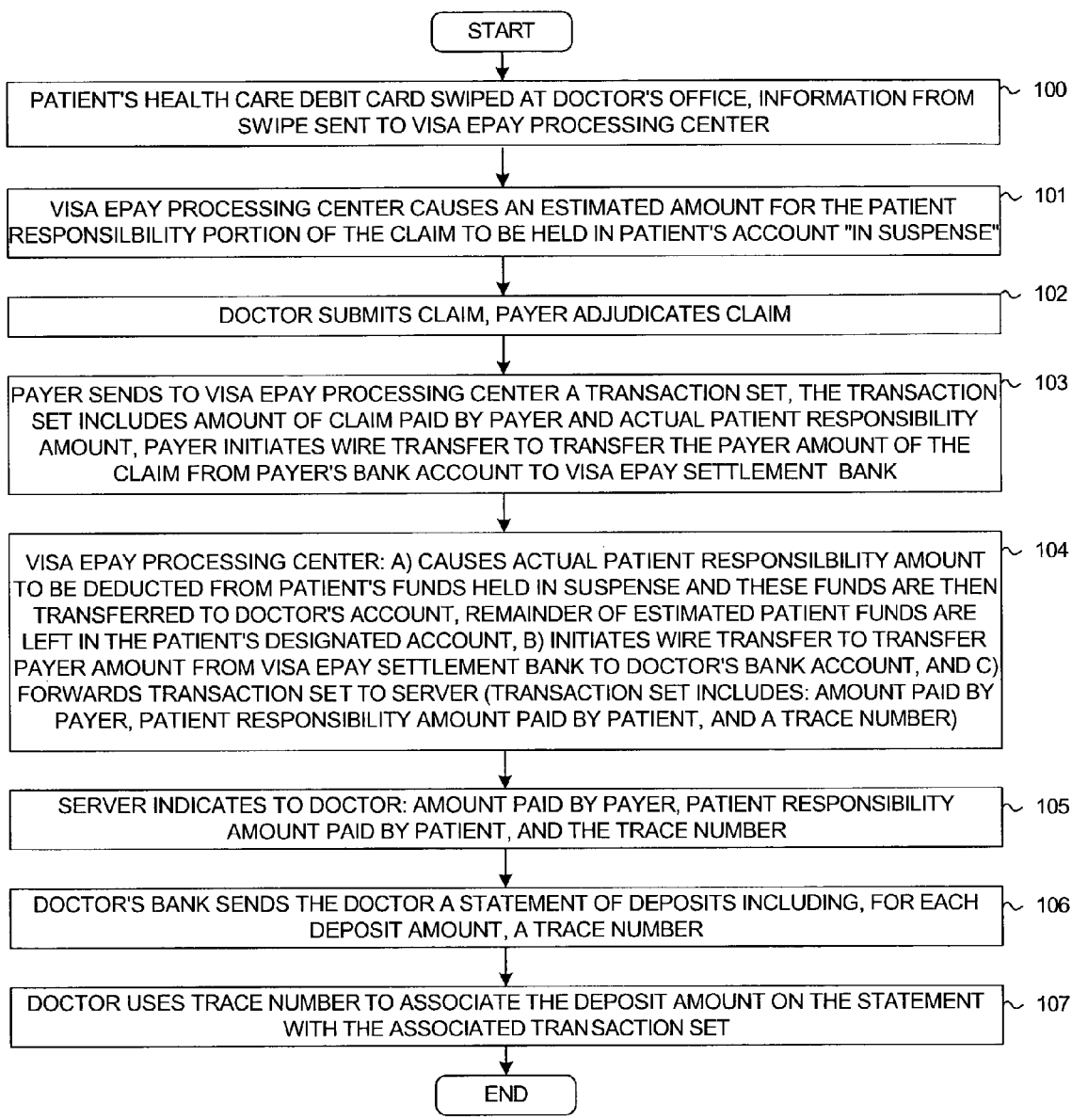
FIG. 1 is a diagram of a method in accordance with an embodiment of the present invention.
Figure 2:
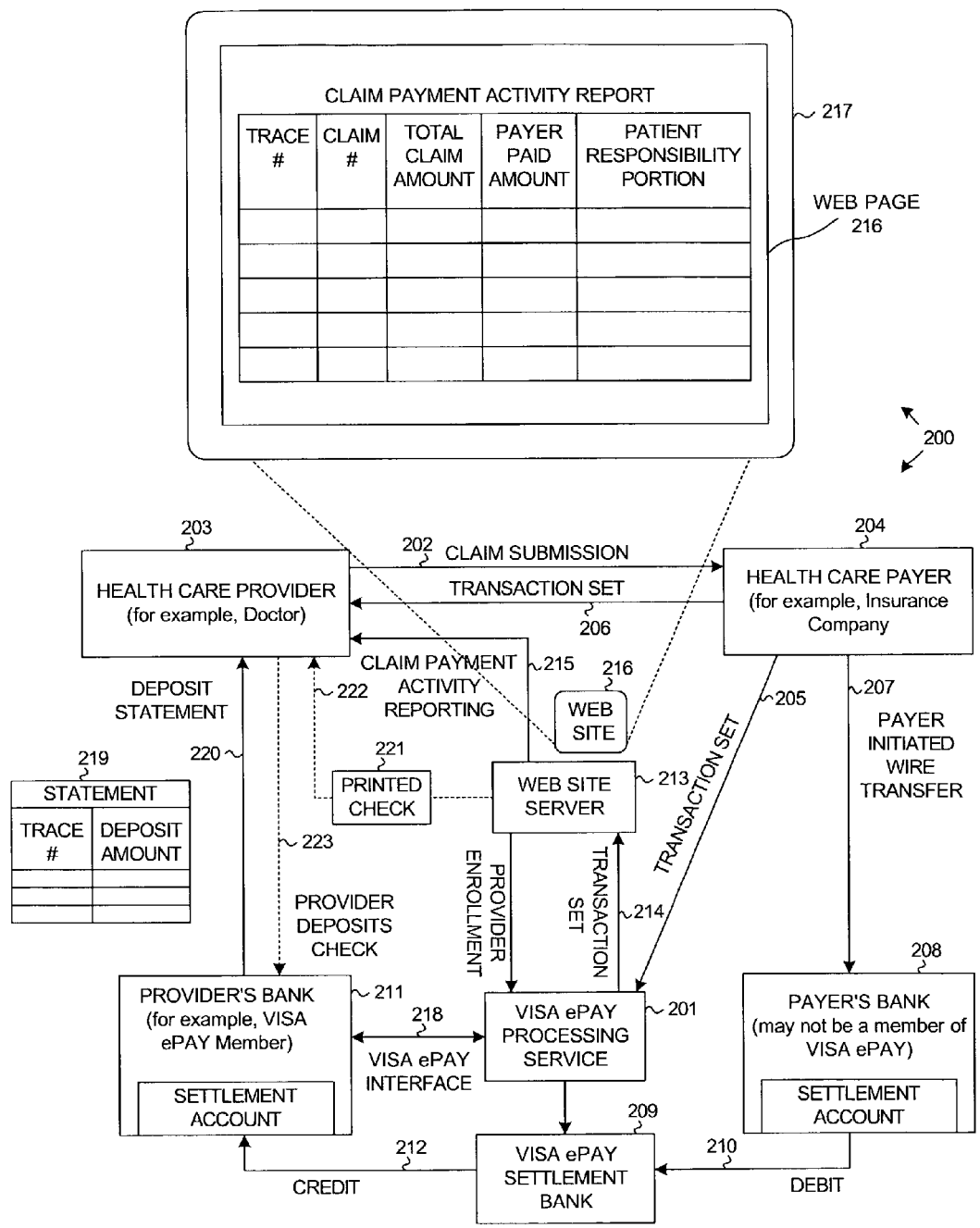
FIG. 2 is a diagram of a system for carrying out the method of FIG. 1.

FIG. 1 is a flowchart in accordance with one embodiment of the present invention. FIG. 2 is a diagram of a system 200 for carrying out the method of FIG. 1.

A patient who has received, or who will receive, health care services from a health care provider (for example, a doctor) will be responsible for payment for a portion of the total cost of the health care services provided or to be provided. The total cost of health care provided is generally billed by the doctor to a payer (for example, an insurance company) and is called a "claim amount". The payer then typically determines the amount it will pay (called a "payer amount") in a process called "adjudication". The payer then sends the doctor an explanation of benefits (called an EOB) indicating the payer amount and a portion for which the patient is responsible (called the "patient responsibility amount"). If the patient responsibility amount and the payer amount do not sum to the claim amount, then there is an "adjustment amount".

Figure 3:
FIG. 3 is a view of a debit card used in the method of FIG. 1.

In the present example, the doctor office wants to bill the patient for the patient responsibility amount. To do this, the patient presents a health care debit card. FIG. 3 is a view of one example of such a health care debit card 300. This debit card 300 is linked to a designated account of the patient. The account can be, for example, a health care payment account, or a tax advantaged account such as a "managed savings account", or a "flexible spending account" of a defined benefit plan, or a regular checking account, or a line of credit. In this example, the debit card is a VISA issued cobranded card that can be authenticated by an existing VISA payment processing system. VISA ePAY processing service block 201 of FIG. 2 is a portion of the VISA payment processing system.

In a first step (step 100), staff at the doctor's office swipes the patient's debit card 300 through a standard magnetic card reader that reads a magnetic stripe on the back of the card. Information from this swipe is sent to ePAY processing center 201. The staff also estimates an amount for which the patient will be responsible and that amount is transmitted to ePAY processing service center 201.

Next (step 101), VISA ePAY processing service center 201 causes the estimated amount for the patient responsibility portion to be held "in suspense" in the linked patient's account. The funds in suspense remain in the patient's designated account, but cannot be paid to anyone other than the doctor until the transaction is consummated.

After health care services are rendered, the doctor submits a claim (step 102) for the "claim amount" to the payer. In FIG. 2 this is illustrated by arrow 202 extending from the health care provider 203 to the health care payer 204. The claim is adjudicated such that the "actual patient responsibility amount" and the "payer amount" are determined.

Next (step 103), the payer sends an ASC X12N 835 transaction set (or a portion of the transaction set relating to financial advise) to VISA ePAY processing service center 201. This is illustrated in FIG. 2 by arrow 205.

Figure 4:
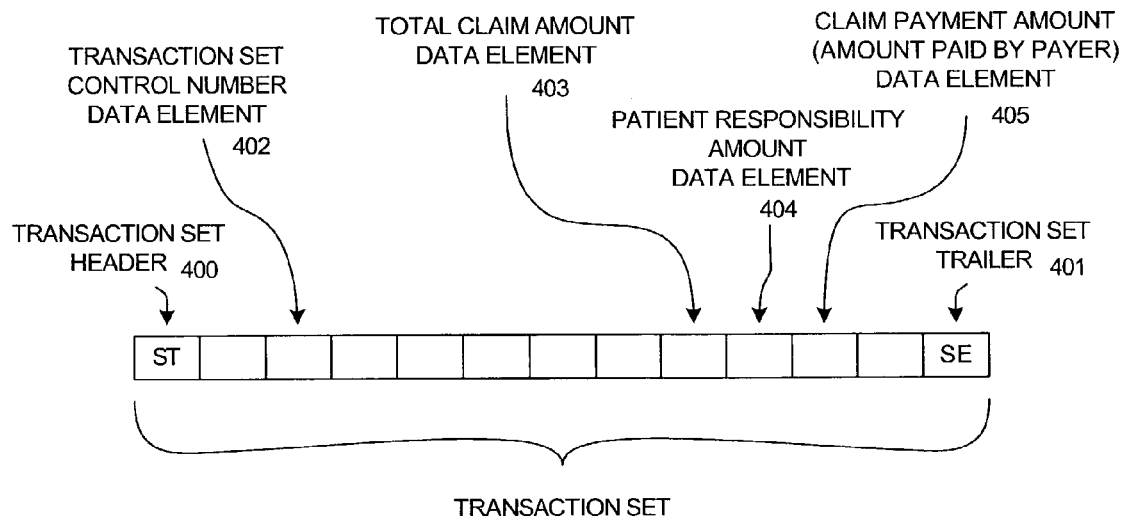
FIG. 4 is a diagram of a transaction set used in the method of FIG. 1.

FIG. 4 is a simplified diagram of the transaction set transmitted to VISA ePAY processing center 201. The transaction set is made up of a plurality of data elements. In the illustrated example, the first data element is an "ST" data element 400 and the last data element is an "SE" data element 401. Other data elements include a "transaction set control number" data element 402, a "total claim amount" data element 403, a "patient responsibility amount" data element 404, and a "claim payment amount" data element 405.

Payer 204 also sends information to doctor 203. This information includes the "patient responsibility amount", the "total claim amount", and the "payer amount". This information can be transmitted to the doctor in any suitable way, including by paper and/or electronically. For example, in one example where the information is transmitted by paper, it is sent in the form of an Explanation Of Benefits (EOB) form. In one example where the information is transmitted electronically, it is transmitted as "electronic remittance advice". In the example of FIG. 2, the electronic remittance advice is an ASC X12N 835 transaction set (206) sent from payer 204 to doctor 203.

Payer 204 also initiates wire transfer (step 103) of the payer amount as indicated in FIG. 2 by arrow 207 extending from payer 204 to payer's bank 208. This authorizes payer's bank 208 to transfer the payer amount to a VISA ePAY settlement bank 209. In FIG. 2, this transfer of funds into VISA ePAY settlement bank 209 is illustrated by arrow 210.

Next (step 104), VISA ePAY processing service center 201 causes the actual patient responsibility amount to be deducted from the patient's funds held in suspense. The patient responsibility amount is then transferred into the doctor's account in the doctor's bank 211. If the originally estimated patient responsibility amount is greater than the actual patient responsibility amount that was adjudicated, then the remainder of the estimated funds is left in the patient's designated account. VISA ePAY processing service center 201 initiates (step 104) a wire transfer to transfer the payer amount from VISA ePAY settlement bank 209 to the doctor's bank account in the doctor's bank 211. In FIG. 2, this transfer is illustrated by arrow 212.

A web site server 213 is also provided in accordance with the present invention. VISA ePAY processing service center 201 also forwards (in step 104) the transaction set (or a portion of it) to web site server 213 as illustrated in FIG. 2 by arrow 214. In the specific example of FIG. 1, the transaction set information forwarded to web site server 213 includes: the "payer amount" paid by payer 204, the "actual patient responsibility amount" paid by the patient from the suspended funds, and a "trace number". This trace number is an identification number associated with the claim.

Next (step 105), web site server 213 supplies to the doctor 203 certain information about the payment of the claim. In the example of FIG. 2, this is indicated by arrow 215 that extends from web site server 213 to doctor 203. This information can be transmitted to doctor 203 as a data file. Alternatively, web site server 213 provides the information to doctor 203 in the form of a web page 216 (a file that is rendered by a browser of a computer and is displayed on a display 217 of the computer in the doctor's office). In the example of FIG. 2, the information transmitted to doctor 203, for each claim, includes: the trace number, a claim number (a data element from the transaction set), the total claim amount (the total claim amount data element from the transaction set), the payer paid amount (the claim payment amount data element from the transaction set), and the actual patient responsibility portion (the patient responsibility amount data element from the transaction set). Although the information may be displayed in the doctor's office in many ways, the information is displayed as a "claim payment activity report" in the example of FIG. 2. In such a report, the information for each different claim appears on a separate line on display 217. In this way, staff in the doctor's office can, at the end of each day, use the web site served by server 213 to determine, for each claim submitted, whether the claim was adjudicated and if so, the amount paid by payer 204 and the amount paid by the patient. The claim number received from web site server 213 can also be used to associate the trace number for the claim with all the other claim information received from payer 204 in the form of the full transaction set (the full transaction set was received from payer 204 as illustrated by arrow 206 in FIG. 2).

The doctor's bank 211 is a member of the VISA ePAY system and therefore communicates with the VISA ePAY processing service center 201 via VISA ePAY interface 218. For each payment amount deposited by the ePAY system into the doctor's bank 211, the VISA ePAY processing service center 201 sends to the doctor's bank 211 the associated trace number (this is the same trace number that is shown on web page 216).

The doctor's bank periodically (step 106) provides doctor 203 with a deposit statement 219. The doctor's bank 211 may send such a deposit statement to the doctor at the end of each month. In the example of FIG. 2, the transmission of deposit statement 219 from the doctor's bank 211 to the doctor 203 is illustrated by arrow 220. As can be seen in FIG. 2, deposit statement 219 includes, for each deposit amount, the associated trace number.

The doctor's office can then use the trace number (step 107) associated with a deposit to identify the other information about the same claim (such as, for example, transaction set information received by the doctor from the payer via arrow 206 and/or transaction set information received by the doctor from web site server 213 via arrow 215). Staff in the doctor's office can, for example, use the trace number to confirm, for each payment indicated by the transaction set information as having been made, that the proper deposit amount actually appears on the deposit statement 219 received from the doctor's bank 211.

Rather than VISA ePAY processing service center 201 transferring funds into doctor's bank 211 electronically, server 213 can be directed to issue a physical check 211. In the illustration of FIG. 2, check 221 is sent via regular mail to doctor 203 as indicated by arrow 222. Doctor 203 then deposits the physical check 211 into the doctor's bank account as indicated by arrow 223. This deposit appears on deposit statement 219 and the associated trace number on deposit statement 219 is usable to find the associated transaction set information that was previously provided to doctor 203 via arrow 206 and/or via arrow 215.

The method set forth above is advantageous in that doctor 203 can receive the patient's authorization to pay the patient responsibility portion in a single patient visit at the time of service, thereby relieving the doctor of the task subsequently billing the patient and then attempting to collect payment from the patient after the patient has already left the doctor's office. Significant paperwork, administrative expense, and/or delay in collection associated with such a second billing and payment cycle is thereby avoided.

A wire transfer to pay a medical claim, such as from a payer's bank to a provider's bank, can be expensive. In one embodiment of the present invention, a payer pays many claims where the transfer of funds for those claims takes the form of a single wire transfer from the payer's bank to the VISA ePay settlement bank. Consequently, the expense to the payer associated with the wire transfers is reduced because the number of wire transfers is reduced. In one example, claims to be paid are collected over a period of time (for example, one day). There may be thousands of such claims. At the end of the period, the payment amounts for the collected claims are summed and a single electronic wire transfer for the sum total of all the collected claims is made.

In one novel aspect, the ERA transaction set transferred from payer 204 to provider 203 (represented in FIG. 2 via arrow 206) is the full transaction set, whereas only a portion of the transaction set (called the "financial advise transaction set") is transferred from payer 204 to VISA ePAY processing Service Center 201 (represented in FIG. 2 via arrow 205). In one embodiment, certain data elements are not included in the financial advice transaction set. Data elements that indicate details of medical services provided are not generally necessary to reconcile deposit amounts with claims. Consequently, for privacy reasons, those data elements are not included in the financial advice transaction set. Moreover, if those sensitive data elements were included in the financial advise transaction set, then additional privacy and securing requirements would be imposed on the system. Not receiving the sensitive data elements is therefore advantageous.

Functional Specification

A functional specification for one embodiment of the invention is set forth below. For purposes of example, the functional specification describes the invention as practiced by an entity referred to as TPN.

Based in Lafayette Calif., TPN will provide services to transmit automated electronic claims payments from Health Care Payers to Health Care Providers producing fair and added value to all transactions.

TPN has developed a shared network Electronic Funds Transfer (EFT)-based method to move funds from payers to providers under Health Insurance Portability and Accountability Act (HIPAA) (Public Law 104-191, 1996) defined ASC X12N 835 standard transaction sets consistent with current published HIPAA Administrative Simplification regulations issued by Health and Human Services.

TPN has developed a product to be known as TPN hPay. VISA has developed a product, known as VISA DPS ePay, that is well-established and fully operational nationwide. When operational, the TPN hPay service can be viewed as an extension of the VISA DPS ePay product.

TPN's health care claim payment and funds settlement method has been designed to save payer time and expense in managing and issuing claim payments and save provider time to receive and account claim payments made.

TPN hPay uses the 835 transaction set(s) to effect assured, accurate, and reliable movement of funds via electronic funds transfer from the payer financial institution and deposits specific identified funds in the correct amounts into the provider's account at respective depository financial institutions. TPN will offer check-writing and transmittal service where and when appropriate, desired, and/or required.

TPN's hPay System provides a federal banking overnight shared funds movement methodology for health care claim payments to health care providers and retailers from health care payers. TPN hPay participating provider and payer entities recognize a simplified, timely and cost reduced system over complex Automated Clearing House (ACH) and expensive claim check printing funds movement systems. Providers can find it administratively difficult to cope with reconciling a multitude of payer claim funds movement systems to their Office Practice Management System's accounts receivable and general ledger that do not provide for easily tracked, audited and timely funds movement. Receiving checks slows the receipt of funds and the provider may incur additional fees when deposited at the provider's financial institution. ACH deposits go directly into the provider's financial institution, but the provider may find it difficult to reconcile when the payer funds were deposited and available by trying to match the payer's Claim Payment Remittance report and the financial institution's account statement. ACH deposits can be overnight, but an ACH deposit can take up to 72 hours to clear based on date and time of submission and the number of Federal Bank Regions involved.

TPN will have a vendor service agreement with VISA DPS to provide electronic funds transfer and settlement processing of the TPN hPay product through the VISA DPS ePay product. The VISA DPS ePay system receives HIPAA defined ASC X12N 835 Health Care Claim Payment/Advice transaction set transmissions from payers in an EFT format. The ASC X12N 835 EFT transaction set is used to debit the claim payment funds from the payer's plan account at its financial institution and deposit (credit) the funds into the provider's account at its financial institution.

The VISA DPS ePay system will receive TPN hpay defined ASC X12N 835 EFT transaction sets from the TPN Payer Members. The ePay system will perform claim payments by EFT from the payer's depository financial institution (DFI) account to the provider. The ePay system will deposit the total actual provider payment amount by EFT into the provider's DFI account if the provider is a TPN hPay Network member. Fees will also be assessed to Providers based on a percentage of the payment claim. In a future phase, if the provider is a non-TPN hPay Network member, VISA DPS ePay will optionally issue a check through a check printing service vendor for mailing to the provider's address.

After ePay receives the payer transmitted ASC X12N 835 EFT transaction set(s), the VISA DPS ePay system translates the transaction set into the internal ePay payment record and inserts provider DFI and account information. The provider's DFI and account information is maintained on the VISA DPS ePay provider file (new). The Provider file will be a new file maintained on the Tandem, which will be merged with Biller data on the IBM. The provider only needs to give its private DFI and DFI account number information to TPN hPay for loading into the VISA DPS ePay provider file, and does not have to disclose the information to every payer from which it may receive claim payments.

The ePay system shall perform the EFT debit of claim payment funds from payers to providers by EFT credit, or check, as a function of it normal ePay settlement day processing. The ePay system will also perform the debit of TPN hPay billing fees from providers and payers as a new feature of the settlement day process. The billing fees collected will be parsed to a TPN hPay DFI and account number and to a VISA DPS ePay selected DFI and account number. The billing fee structure and the parsing of the billing fees collected are defined in the service agreement between TPN and VISA DPS.

As the ePay system performs its edit processing, if an edit error reject reason occurs, a reject reason code is set in the ASC X12N 835 EFT transaction set's financial information data segment. All ASC X12N 835 EFT transaction sets processed during the VISA DPS ePay settlement day are then forwarded to the TPN hPay host processor/web site server. The TPN hPay host/server then provides the TPN hPay Settlement Day Activity Reports to the provider with the results of the claim payment funds movement activity between each payer and provider processed during the settlement day.

FIGS. 5A, 5B and 5C comprise a table containing definitions of key terms.

The information contained within the TPN hPay Solution System database will reflect all the data forwarded to the TPN hPay Solution System from the VISA DPS ePay System, all of the definitional information needed for the TPN hPay Solution System to create and forward Provider file data to the VISA DPS ePay System, and any other definitional information needed for the TPN hPay Solution System to produce Settlement Day Activity Reports or to support back office processes that fall within the scope of the TPN hPay Solution System.

A significant amount of information is forwarded from VISA DPS ePay and must be reflected in its entirety in the TPN hPay Solution System database. The informtaion falls into the following categories.

Transmission information: The ACS X12N 835 data as received by VISA DPS ePay system from a TPN Payer Member plus appended information created by the VISA DPS ePay system that establishes the initial state of the ACS X12N 835 data as well as, provides additional information and linkages to the data as it exists within the VISA DPS ePay system. This Transmission information is defined within Appendix E of this document.

Event information: ACS X12N 835 information created by the VISA DPS ePay system to inform the TPN hpay Solution System of changes to the state of the data reflected by the Transmission information previously forwarded. This Event information is defined within Appendix D of this document.

Return information: ACS X12N 835 information created by the VISA DPS ePay system to notify the TPN hPay Solution System of payment claim returns that have occurred. This return information is defined within Appendix F of this document.

Fee information: ACS X12N 835 information created by the VISA DPS ePay system that reflects all the fees accessed by the VISA DPS ePay system for a given day. This fee information is defined within Appendix E of this document.

Definitional information for the Provider File. The TPN hPay Solution System database must contain the information needed to create the TPN Provider File that is forwarded to the VISA DPS ePay system. This information is expected to be created via some form of a data entry process supported by the TPN hPay Solution System. The information to be contained within the TPN Provider File is defined within Appendix G of this document.

Other definitional information. The TPN hpay Solution System database will need to contain other definitional information to allow the TPN hPay Solution System to produce Settlement Day Activity Reports and to support back office processes that fall within the scope of the TPN hPay Solution System. This information is currently undefined. The expectation is that it will be created via data entry processes supported by the TPN hPay Solution System and that the definition of the information will be a byproduct of the processes that create a more finite definition of the TPN hPay Solution System.

Figure 6:
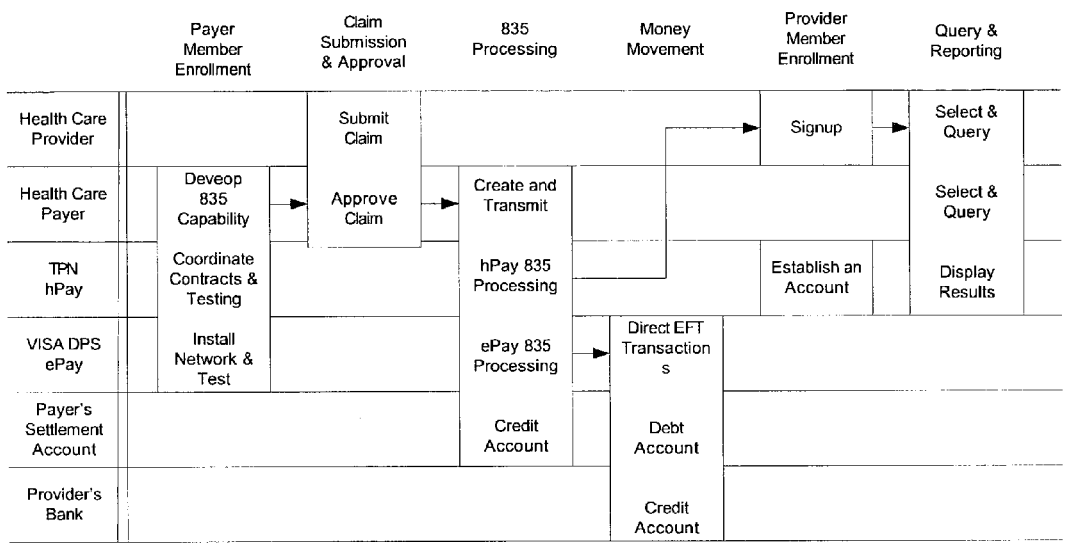

FIG. 6 is a Cross-Functional Process Map that illustrates the flow of information and data among the six entities that comprise and support the TPN System in time sequence from left to right.

Figure 7:
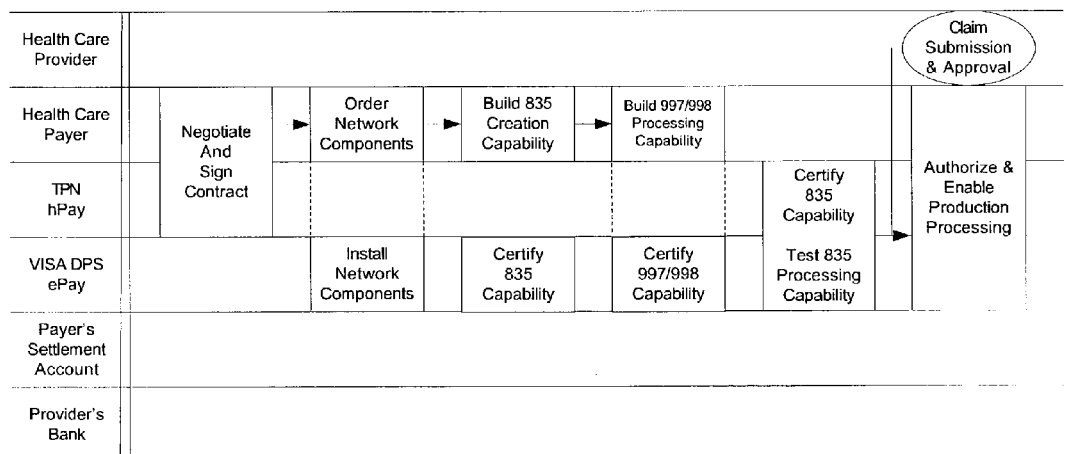

FIG. 7 is a Cross-Functional Process Map that illustrates the Payer Member Enrollment Process.

Once a Payer decides to become a Payer Member in the TPN hPay System, he goes through the Payer Member Enrollment Sub-Process, comprised of "N" steps. At this time, the specific steps have not been identified but are illustrated as collecting basic payer information, negotiating contract, payer developing 835 capability, testing 835, etc., followed by authorization for production.

Most of the steps in the enrollment occur outside of the TPN hPay Solution System: installation of telecommunications equipment between the Payer and VISA DPS, development of an 835-creation capability, discussions/negotiations with TPN, VISA DPS and/or banks. The Payer Member Candidate Enrollment Process Tracking page is the primary tool used by CSRs to track a Payer Member Candidate through this process.

Contracts between TPN and the Payer, between the Payer and VISA DPS and/or between the Payer and its Bank detail the rights and responsibilities, and specify the terms and conditions of each party. The TPN hPay Solution System plays no role in this set of activities other than tracking the progress via the Payer Member Candidate Enrollment Process Tracking page.

The Payer orders the communications link between the Payer and VISA DPS directly from VISA. The TPN hPay Solution System plays no role in this set of activities other than tracking the progress via the Payer Member Candidate Enrollment Process Tracking page.

The communications link between the Payer and VISA DPS is acquired, provisioned, installed and tested by VISA DPS with the assistance of the Payer. The TPN hPay Solution System plays no role in this set of activities other than tracking the progress via the Payer Member Candidate Enrollment Process Tracking page.

In this step, the Payer acquires the capability of sending Transmissions containing 835s to the VISA DPS ePay System. A Payer may develop the capability internally using internal or external resources, or the Payer may outsource the creation and transmission activities to a third-party. However acquired, the 835s created must conform to the standards published by TPN. The TPN hPay Solution System plays no role in this set of activities other than tracking the progress via the Payer Member Candidate Enrollment Process Tracking page.

VISA DPS and the Payer engage in an iterative cycle of testing the Transmissions containing 835s created by the Payer. The testing includes all layers, all components and all scenarios. A joint decision is made between VISA DPS and the Payer whether the capability acquired by the Payer to generate and send Transmissions containing 835s to the VISA DPS ePay System is acceptable and viable. If the decision is "no", then the iterative cycle of testing continues. If the decision is "yes", then the involvement of TPN begins. The TPN hPay Solution System plays no role in this set of activities other than tracking the progress via the Payer Member Candidate Enrollment Process Tracking page.

In this step, the Payer acquires the capability of receiving 997/998s from the VISA DPS ePay System. A Payer may develop the capability internally using internal or external resources, or the Payer may outsource the creation and transmission activities to a third-party. However acquired, the 997/998s received must conform to the standards published by TPN. The TPN hpay Solution System plays no role in this set of activities other than tracking the progress via the Payer Member Candidate Enrollment Process Tracking page.

VISA DPS and the Payer engage in an iterative cycle of testing the 997/998s created by the VISA DPS ePay System. The testing includes all layers, all components and all scenarios. A joint decision is made between VISA DPS and the Payer whether the capability acquired by the Payer to receive and process 997/998s from the VISA DPS ePay System is acceptable and viable. If the decision is "no", then the iterative cycle of testing continues. If the decision is "yes", then the involvement of TPN begins. The TPN hPay Solution System plays no role in this set of activities other than tracking the progress via the Payer Member Candidate Enrollment Process Tracking page.

Once it is decided that the Payer and VISA DPS have successfully tested the abilities of both organizations to process the Payer's claim payment data via Transmissions containing 835s and to acknowledge it with a 997/998 Interchange Acknowledgement, the enrollment process expands to include the TPN hPay Solution System. The VISA DPS ePay System sends a Transmission to TPN hPay Solution System for testing. It is possible that this step will have to be repeated prior to final production authorization.

The TPN hPay Solution System must prepare for the receipt of a Transmission from the VISA DPS ePay System for a new Payer. At this point, there is little chance that the structure, format or content of the Transmission is in error; the exchange of data between hPay and ePay in all its forms has been completely tested and verified. Testing in this step is to ensure that all the tables and databases have been correctly populated with the attributes and flags necessary to process a continual stream of Transmissions from the VISA DPS ePay System for this Payer. With rare exceptions, the TPN hPay Solution System alone can respond to any issues or problems with this Payer's data. External assistance should be limited to advice or coordination.

The progress of this step is tracked via the Payer Member Candidate Enrollment Process Tracking page.

A joint decision is made between VISA DPS and TPN whether the ability of the two organizations to process and exchange information about the Payer's claim payments is acceptable and viable. If the decision is "no", then the iterative cycle of testing continues. If the decision is "yes", then the systems are certified to begin processing of this Payer.

A joint decision is made among key representatives of TPN, VISA DPS and the Payer whether to begin the production processing of Transmissions for this Payer. Once all issues or problems have been successfully addressed, a "Go Live" decision is made and a start date is set for production.

Once a patient has received treatment from a health care Provider, the Provider submits a claim to the patient's health insurance carrier, or "Payer Member". The Payer Member decides how much, if any, to reimburse the Provider. If the Provider is a member of the TPN hpay System, the Payer Member initiates a process to submit an 835 to the VISA DPS ePay System.

Figure 8:
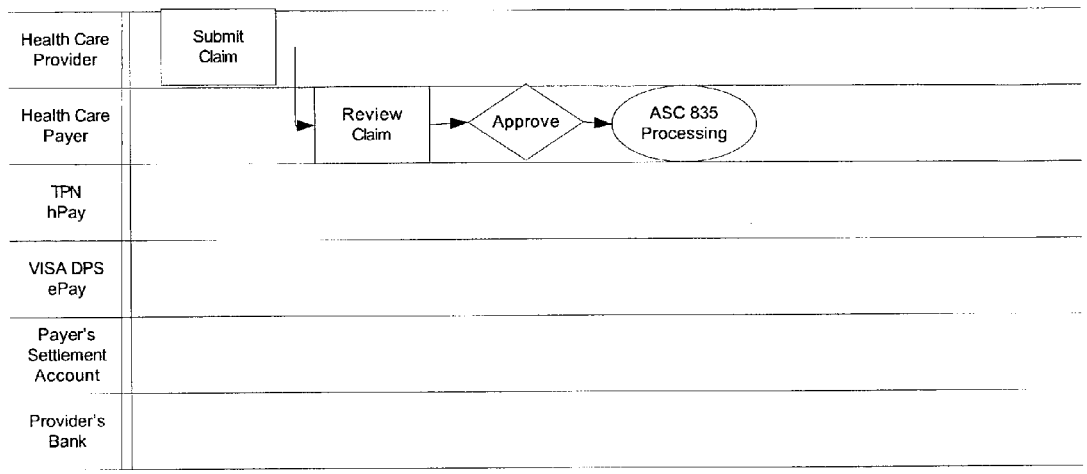

FIG. 8 is a Cross-Functional Process Map that illustrates the Claim Submission and Approval Process.

The health care Provider provides treatment to a patient and collects information about the patient's health insurance carrier, or "Payer Member". The health care Provider submits a claim to the Payer Member using the procedures and protocol established by the Payer Member. The TPN hPay Solution System plays no role in this set of activities.

The Payer Member receives the claim and executes its internal processes to approve and/or adjudicate the claim. The TPN hPay Solution System plays no role in this set of activities.

The Payer Member decides whether to pay any amount to the Provider. If not, the Payer Member relays the decision to the Provider via channels external to the TPN hPay Solution System. If so, the Payer Member initiates his internal process to transmit an 835 to VISA DPS ePay. The TPN hPay Solution System plays no role in this set of activities.

Figure 9:
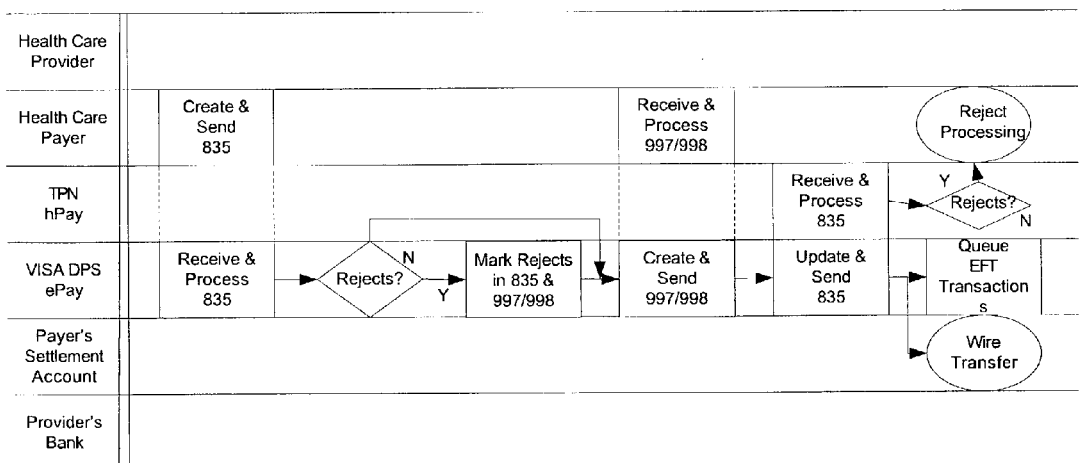

FIG. 9 is a Cross-Functional Process Map that illustrates the 835 Processing Process.

Payer Members send information about health care claim payments over a secured telecommunication path to the VISA DPS ePay System. The information is contained as logical records, know as segments, in a physical file. The physical file is a Transmission and is bounded by two pairs of segments. The beginning pair of segments is an Interchange Control Header (ISA) and a Functional Group Header (GS); the matching ending pair of segments is a Functional Group Trailer (GE) and an Interchange Control Trailer (IEA). A Transmission, therefore, is all the information contained with and between the ISA and the IEA segments, inclusive. There is only one Transmission per physical file. The Interchange Control Number in the ISA13 field uniquely identifies each Transmission.

A Transmission contains a (logically) unlimited number of 835s. Each 835 is bounded by a pair of segments. The beginning segment is a Transaction Set header (ST); the matching ending segment is a Transaction Set Trailer (SE). An 835, therefore, is the information contained within and between the ST and the SE segments, inclusive. There must be one and can be many 835s in a Transmission. The Retrieval Reference Number in the TPN03 field uniquely identifies each 835.

The specific data elements within each segment are documented in: ASC X12N 835 (004010X091) National Electronic Data Interchange Transaction Set Implementation Guide "Health Care Claim Payment/Advice" (May 2000); and "VISA DPS ePay to TPN hPay ASC X12N 835 Electronic Funds Transfer (EFT) Transaction Set".

The VISA DPS ePay System edits the Transmission. The VISA DPS ePay System transmits back to the Payer Member the 997/998, which serves to acknowledge the receipt of the Transmission and to advise the Payer Member of any conditions within the Transmission that caused the VISA DPS ePay System to reject all or part of the Transmission.

The VISA DPS ePay System processes the Transmission. Upon completion, the VISA DPS ePay System updates several fields in the Transmission to reflect state or add information and the VISA DPS ePay System appends a new segment, the "TPN" segment, to the end of each 835. The TPN segment contains information needed by the TPN hPay Solution System about the state of the 835 and the results of the processing by the VISA DPS ePay System. By appending the TPN segment to the 835, an 835 is now bounded by a trio of segments. The beginning segment is a Transaction Set header (ST); the matching ending pair of segments is a Transaction Set Trailer (SE) and a TPN (TPN). As transmitted to the TPN hPay Solution System from the VISA DPS ePay System, an 835, therefore, is the information contained within and between the ST segment and the SE/TPN segment pair, inclusive.

The Payer Member creates, on his own schedule and at his own pace, a Transmission and transmits it to the VISA DPS ePay System over a secured telecommunications path. For the Beta Release, the Payer Member will include 835 information only for health care providers who are TPN Member Providers. If there is a failure in the sending of the Transmission, the recovery will be coordinated directly between VISA DPS and the Payer Member. The TPN hPay Solution System plays no role in this set of activities.

The VISA DPS ePay System receives the Transmission from the Payer Member. The VISA DPS ePay System edits the Transmission at the field, segment and Transmission levels looking for conformance to form, format, and segment count and dollar amount balancing. The VISA DPS ePay System adds a TPN segment to each 835. The TPN hPay Solution System plays no role in this set of activities.

As the VISA DPS ePay System processes a Transmission, it may discover errors at the Transmission, segment or field levels based on form, format, inter-field edits, or intra-field edits. Depending on the severity of the error, the VISA DPS ePay System may reject a single 835, multiple 835s or an entire Transmission. The TPN hPay Solution System plays no role in this set of activities.

If there are any rejects, the VISA DPS ePay System records the reject code and the reject reason code in the ISA02 field for a Transmission reject or in the TPN05 field for an 835 reject. The VISA DPS ePay System also records the reject code and the reject reason code in the 997/998 Interchange Acknowledgement file. The TPN hPay Solution System plays no role in this set of activities.

Upon completing its edit of the Transmission, the VISA DPS ePay System sends over a secured telecommunications path the 997/998 Interchange Acknowledgement file, comprised of multiple Functional Acknowledgements, back to the Payer Member to notify him that the original Transmission was received and of the results of that processing. The TPN hPay Solution System plays no role in this set of activities.

The Payer Member receives the 997/998 Interchange Acknowledgement from the VISA DPS ePay System and processes it. Primarily the Payer Member is determining whether the Transmission was received, whether it was accepted or rejected, and whether each 835 was accepted or rejected. Among the many valuable uses of the information, the Payer Member may determine the amount of the Wire Transfer needed to cover the EFTs to the Provider Members of all the accepted 835s. The TPN hPay Solution System plays no role in this set of activities.

The VISA DPS ePay System has already updated the ISA02 field to reflect a Transmission "REJECT", if appropriate, and the TPN05 field to reflect an 835 "REJECT", if appropriate. If the Transmission was rejected, all the 835s are marked as rejected. The VISA DPS ePay System updates significant fields in any 835 that was not rejected, by placing an "EFT" in the TPN05 field as an indication that an electronic funds transfer was initiated, and the Retrieval Reference Number in the TPN03 field. The Transmission is forwarded, over a secured telecommunications path, to the TPN hPay Solution System. The TPN hPay Solution System plays no role in this set of activities.

The TPN hPay Solution System receives the Transmission, parses, evaluates the contents, and loads it into the TPN hPay Host database marking the state of the data as either "Rejected" or "Pending". Pending is defined as the VISA DPS ePay System ready to issue one or more EFTs to the Provider Member but waiting for the Payer Member to initiate a wire of funds from their settlement account to the VISA DPS settlement bank. Rejected is defined as data that VISA DPS has marked as REJ in the ISA02 field.

For each 835 that was not rejected, an EFT is created that would credit the Provider's bank account for the amount in the BPR02 field of the BPR segment. The EFT's are suspended in a queue, awaiting the positive results of the Wire Transfer Sub-Process. The TPN hPay Solution System plays no role in this set of activities.

Figure 10:
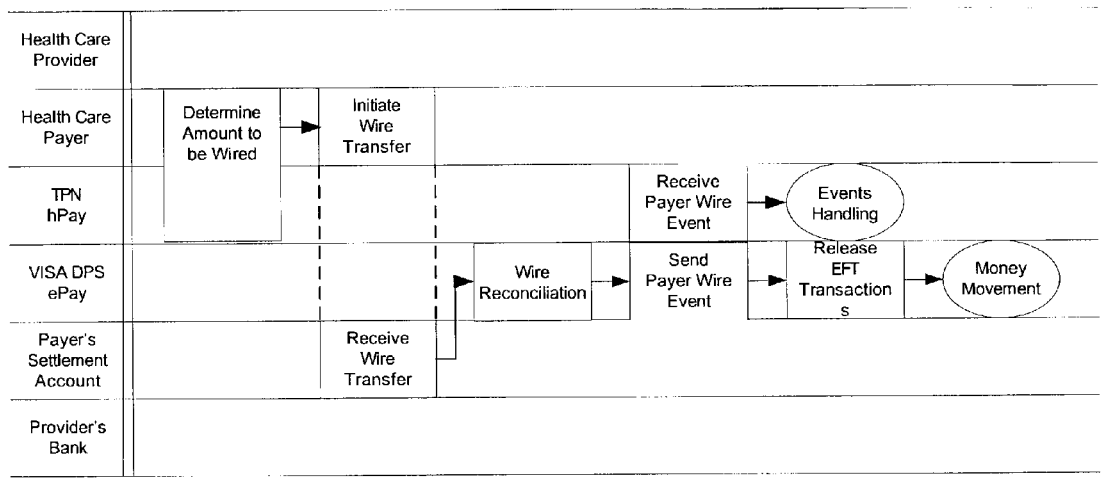

FIG. 10 is a Cross-Functional Process Map illustrating the Wire Transfer Sub-Process.

The VISA DPS ePay System initiates Electronic Funds Transfer transactions to credit a Provider Member's bank account and to debit a Payer Member's Settlement Account. Before the VISA DPS ePay System is allowed to issue those EFTs, VISA DPS must know that sufficient funds have been deposited in the Payer Member's Settlement Account to cover the EFT debits.

The Payer Member User uses the Payer Member Pending Transmissions Summary Page to determine the total amount of funds necessary to cover all the monetary amounts in the non-rejected 835s that are pending within the VISA DPS ePay System. The Payer Member wires the funds to his Settlement Account. Within VISA DPS, the reconciliation process identifies that funds have been deposited and releases a set of Transmissions for the EFT process. The VISA DPS ePay System then notifies the TPN hPay Solution System that a wire has been received and EFT have been released.

The Payer Member User logs onto the Payer Member Website and accesses the Payer Member Pending Transmissions Summary Page to determine how much money is required by the Settlement Account to cover one or more Transmissions.

The Payer Member uses his internal procedures to initiate a wire transfer of funds from his bank (or banks) to his Settlement Account. The TPN hPay Solution System plays no role in this set of activities.

The bank that manages the Settlement Account receives the wire transfer, ensures the money is deposited into the Settlement Account and notifies the VISA DPS ePay System of the deposit. The TPN hPay Solution System plays no role in this set of activities.

VISA DPS compares the deposit notification from the bank that manages the Settlement Account and the list of Transmissions being held. VISA DPS releases to the ePay System a number of ePay EFT deposit transactions that reflect a Payer's Transmissions according to the guidelines and procedures developed by VISA DPS for the Wire Reconciliation. The TPN hPay Solution System plays no role in this set of activities.

The VISA DPS ePay System creates a Payer Wire Event Message in an Event File and transmits it to the TPN hPay Solution System. The Payer Wire Event Message identifies the Payer Member who sent the wire transfer, the amount of the wire transfer and the Transmissions covered by the wire transfer. The TPN hPay Solution System plays no role in this set of activities.

The TPN hPay Solution System receives the Event File, comprised of one or more Payer Wire Event Messages. For each Transmission released as a result of the VISA DPS Wire Reconciliation process, the EFTs that resulted from processing non-rejected 835s are released to the banking system. The TPN hPay Solution System plays no role in this set of activities.

If the Transmission's state is "REJECTED" or any of the 835s state is "REJECTED", then the Reject Processing Sub-Process is executed.

Figure 11:
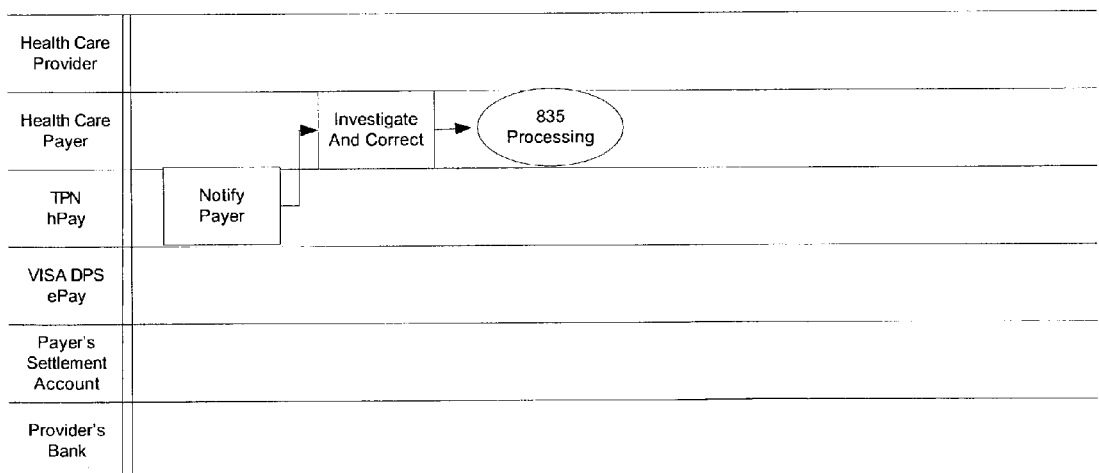

FIG. 11 is a Cross-Functional Process Map that illustrates the Reject Processing Sub-Process.

If any 835 is rejected, the VISA DPS ePay System will not initiate the Money Movement process for that 835. The Payer Member must be notified of all rejected 835s so that any necessary corrective actions can occur.

TPN CSRs will use the Rejected Transmission Tracking page to identify rejected transmissions and to track the communications between TPN and the Payer Member. The CSR will follow the documented procedure for notifying a Payer Member that an entire transmission was rejected.

TPN CSRs will use the Rejected 835 Tracking page to identify rejected 835s and to track the communications between TPN and the Payer Member. The CSR will follow the documented procedure for notifying a Payer Member that an 835 was rejected.

Based on the information received from the TPN CSR, the Payer Member investigates the root cause of the rejected transmission and/or 835 and takes the appropriate action necessary. The TPN hPay Solution System plays no role in this set of activities.

Figure 12:
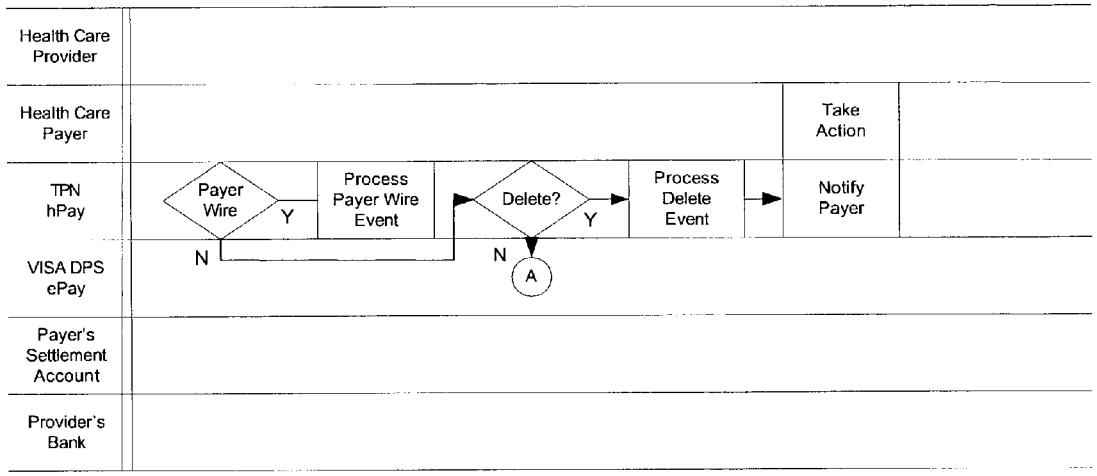
Figure 13:
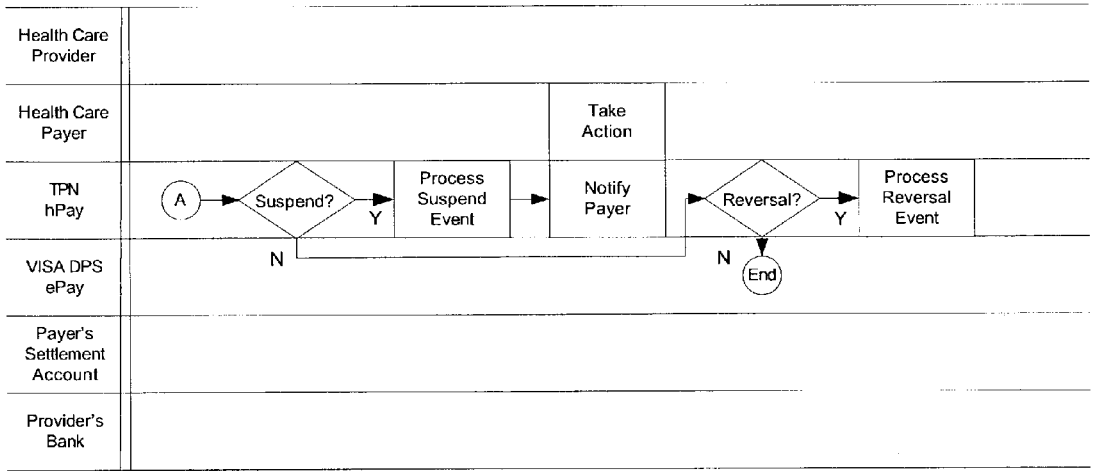

FIG. 12 is the first of two Cross-Functional Process Maps illustrating the Events Handling Sub-Process (see FIG. 13).

There are four events that occur within the VISA DPS ePay System that must have a corresponding event occur within the TPN hPay Solution System: the Payer Wire event signals the receipt of a Wire Transfer of sufficient funds to pay for all the EFTs to be generated by one or more Transmissions; the Delete event signals that no Wire Transfer has been received of sufficient funds to pay for all the EFT's to be generated by one or more Transmissions and those Transmissions are to be deleted from the TPN hPay Solution System; the Suspend event signals that no Wire Transfer has been received of sufficient funds to pay for all the EFT's to be generated by one or more Transmissions and those Transmissions are to be suspended from processing by the TPN hPay Solution System; and the Reversal event signals that a single Transmission is to be deleted from the TPN hPay Solution System.

The Delete event and the Suspend event require notification to the Payer Member.

The VISA DPS ePay System transmits to the TPN hPay Solution System an Event File containing any number and combination of Event Messages. At this time, the structure of the Event File and the Event Messages had not been finalized.

Assume the Event Message received from VISA DPS is for a Payer Wire event.

A single Payer Wire Event Message applies to a single Payer Member. For that Payer Member, it indicates an unlimited number of Transmissions, identified by their Interchange Control Numbers, that cleared the Wire Reconciliation process on a specified day, the "Settlement" date. Each Transmission identified in the Payer Wire Event Message will force a state change of the corresponding Transmission data contained within the TPN hPay Host database, from its current state to "PAID."

Assume the Event Message received from VISA DPS is for a Delete event.

A single Delete Event Message (e.g. a Reversal Segment with a "deleted" Reason Code) applies to a single Payer Member. For that Payer Member, it indicates one Transmission, identified by its Interchange Control Number, that will be deleted from the TPN hPay Solution System. The Transmission identified in the Payer Wire Event Message will force a state change of the corresponding Transmission data contained within the TPN hPay Host database, from its current state to "Deleted".

An email message is generated to the Payer Member (cc: TPN Customer Service) notifying them of the deletion of a Transmission due to the lack of a Wire Transfer to cover the anticipated EFT transactions. The email contains information sufficient for the Payer Member to identify the Transmission affected.

The Payer Member takes whatever action it deems necessary.

FIG. 13 is the second of two Cross-Functional Process Maps illustrating the Events Handling Sub-Process (see FIG. 12)

Assume the Event Message received from VISA DPS is for a Suspend event.

A single Suspend Event Message (e.g. a Reversal Segment with a "suspended" Reason Code) applies to a single Payer. For that Payer, it indicates one Transmission, identified by its Interchange Control Number, that will be suspended from processing within the TPN hPay Solution System. The Transmission identified in the Payer Wire Event Message will force a state change of the corresponding Transmission data contained within the TPN hPay Host database, from its current state to "Suspended."

An email message is generated to the Payer Member (cc: TPN Customer Service) notifying them of the suspension of processing of a Transmission due to the lack of a Wire Transfer to cover the anticipated EFT transactions. The email contains information sufficient for the Payer Member to identify the Transmission affected.

The Payer Member takes whatever action it deems necessary.

Assume the Event Message received from VISA DPS is for a Reversal event.

A single Reversal Event Message (e.g. a Reversal Segment with a "payer initiated" or "ePay initiated" Reason Code) applies to a single Payer Member. For that Payer Member, it indicates one Transmission, identified by its Interchange Control Number, that will be reversed out of the TPN hPay Solution System. The Transmission identified in the Payer Wire Event Message will force a state change of the corresponding Transmission data contained within the TPN hPay Host database, from its current state to "Reversed."

The Payer Member is not notified of the reversal.

Figure 14:
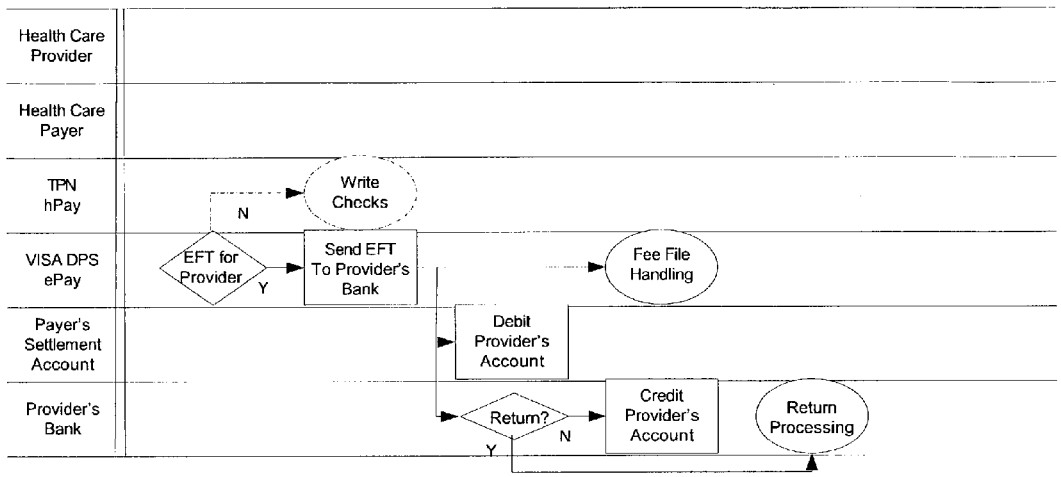

FIG. 14 is a Cross-Functional Process Map illustrating the Money Movement Process.

The goal of the Money Movement process is to provide value to Payer Members by using EFT to transfer funds from the Payer Member's Settlement Account to the Provider Member's bank. In the Beta Release of the TPN System, all Provider Members will be required to bank at ePay Member Banks that are capable of receiving EFT transactions from the VISA DPS ePay System. Once an 835 has been successfully processed and released for EFT, the VISA DPS ePay System initiates the EFT activity. An EFT is issued to debit the Payer Member's Settlement Account and another is issued to credit the Provider's bank. Occasionally, the Provider Member's bank will be unable to complete the deposit and will generate a Return to the VISA DPS ePay System.

By Provider, a decision is made whether the Provider banks at an ePay Bank and is therefore able to receive EFTs from the VISA DPS ePay System. For the Beta Release, Providers who are NOT enrolled as Provider Members will be rejected by the VISA DPS ePay System prior to this step. Since a criterion of becoming a Provider Member is banking at an ePay Bank, this check should always be passed. The TPN hPay Solution System plays no role in this set of activities.

In a future release, the VISA DPS ePay System will initiate the process that writes a check directly to the Provider.

The VISA DPS ePay System sends an EFT to the Provider Member's bank for the total amount in the BLP segment of each 835 released to EFT by the Wire Reconciliation process. The TPN hPay Solution System plays no role in this set of activities.

The Provider Member's Bank receives the EFT and attempts to process it. If the Bank is unable or unwilling to process it, the Bank initiates the Return Process.

Figure 15:
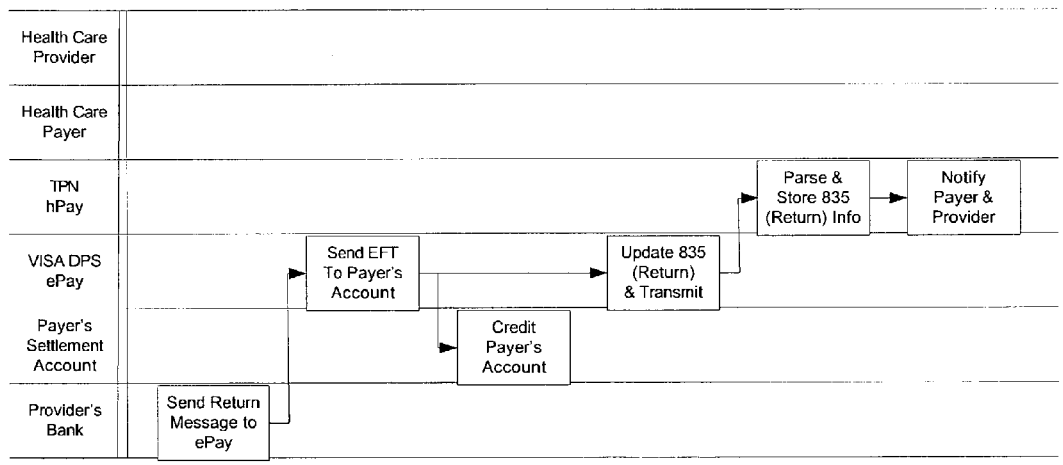

FIG. 15 is a Cross-Functional Process Map that illustrates the Return Processing Sub-Process.

When a Provider Member's bank issues a return to the VISA DPS ePay System, the VISA DPS ePay System issues an appropriate credit back to the Payer Member's Settlement Account and sends an 835 back to the TPN hPay Solution System.

The Provider Member's Bank sends a Return message to the VISA DPS ePay System. The TPN hPay Solution System plays no role in this set of activities.

The VISA DPS ePay System issues an EFT for a credit back to the bank that manages TPN's settlement account. The TPN hPay Solution System plays no role in this set of activities.

The bank that manages the Payer Member's Settlement Account issues the Payer Member a credit. The TPN hPay Solution System plays no role in this set of activities.

On a scheduled to be determined, the VISA DPS ePay System creates a Transmission file ("hPay 835 Return File") comprised of 835s ("Returned 835s") that were used by the VISA DPS ePay System to create EFT transactions to Provider Member Banks that were subsequently returned. The hPay 835 Return File is identified by an ISA02 field that contains "RETURN". The hPay 835 Return File is transmitted to the TPN hPay Solution System.

The VISA DPS ePay System will transmit an hPay 835 Return File to the TPN hPay Solution System at least once per day even if there are no Returns. In that case, the hPay 835 Return File will be a Transmission with no 835s.

Upon receipt of the hPay 835 Return File, the TPN hPay Host System will force a state change of the corresponding 835 data contained within the TPN hPay Host database, from its current state to "Returned." Matching is done on the Retrieval Reference Number.

For each Returned 835 received, an email will be sent to the TPN CSR informing him that a Return was received and processed by hPay. The email will contain: Provider Name and Address, Provider Contact information, Payer Member Name and Address, Payer Member Contact information, Payment information and Amount, and Return Reason Description. The CSR will then follow the documented process for notifying the Payer Member and/or the Provider Member that a Return was processed.

The returned amount may be forwarded to the Provider Member in a number of ways, such as by check, ACH, or wire transfer.

Having determined it can, the Provider Member's bank credits the Provider Member's account per the EFT instructions. The TPN hPay Solution System plays no role in this set of activities.

The TPN hPay Solution System plays no role in the activities by which the EFT is sent to the Payer's Account.

The VISA DPS ePay System debits the Payer Member's Settlement Account for the total amount in the BLP segment of each 835 released to EFT by the Wire Reconciliation process. The TPN hPay Solution System plays no role in this set of activities.

FIG. 16 is a Cross-Functional Process Map that illustrates the Fee File Handling Sub-Process.

The VISA DPS ePay System sends information about the fees charged by VISA DPS to the Provider Members on behalf of TPN over a secured telecommunication path to the TPN hPay Solution System. The information is contained as logical records, know as segments, in a physical file. The physical file is a Fee File and is bounded by two pairs of segments. The beginning pair of segments is an Interchange Control Header (ISA) and a Functional Group Header (GS); the matching ending pair of segments is a Functional Group Trailer (GE) and an Interchange Control Trailer (IEA). A Fee File, therefore, is all the information contained with and between the ISA and the IEA segments, inclusive. There is only one Fee File per physical file. The Interchange Control Number in the ISA13 field uniquely identifies each Fee File. A Fee File is distinguished from other variations on an ASC X12N 835 by the presence of the value "FEE" in the ISA02 field.

A Fee File contains a (logically) unlimited number of Fee Transaction Sets. A pair of segments bound each Fee Transaction Set. The beginning segment is a Transaction Set header (ST); the matching ending segment is a Transaction Set Trailer (SE). A Fee Transaction Set, therefore, is the information contained within and between the ST and the SE segments, inclusive. There must be one and can be many Fee Transaction Sets in a Fee File. The Transactions Set Control Number in the ST02 field uniquely identifies each Fee Transaction Set.

A Fee Transaction Set must contain two logical sets of data. Each set is comprised of one or more segments. The mandatory two sets, in the required sequence, are: first, a single Financial Information (BPR) segment; and second, a single set of Provider Identification (Loop 1000B) segments comprised of, in the required sequence, exactly one Provider Name (N1) segment, exactly one Provider Address (N3) segment, and exactly one Provider City, State, Address (N4) segment.

The specific data elements within each segment are documented in: ASC X12N 835 (004010X091) National Electronic Data Interchange Transaction Set Implementation Guide "Health Care Claim Payment/Advice" (May 2000); and "VISA DPS ePay to TPN hPay ASC X12N 835 Electronic Funds Transfer (EFT) Transaction Set".

At the end of the settlement day, after all Transmissions for the settlement day are completed and the Wire Reconciliation process has completed, the VISA DPS ePay System builds a Fee File and transmits it over a secured telecommunication path to the TPN hPay Solution System. The TPN hPay Solution System plays no role in this set of activities.

An ASC X12N 835 that contains the letters "FEE" in the first three positions of the ISA02 (Authorization Information) field is known as a Fee File and contains the VISA DPS ePay System end-of-settlement-day Provider fee reporting information.

The total amount of the Provider's fee for the Settlement Day is contained in the BPR02 field. The TPN hPay Solution System will record in the Provider Fee Database: the Provider's fee for the Settlement Day, and a link to each 835 processed through to EFT by the VISA DPS ePay System during the same Settlement Day.

FIG. 17 is a Cross-Functional Process Map that illustrates the Provider Member Enrollment Process.

Provider organizations that wish to become participants in hPay contact hPay's sales executives via telephone or email via the Web site. Once the participant signs the hPay agreement, a CSR begins the enrollment process by entering basic information into the Provider Member Profile database via the Provider Member Profile Add Page. A new Provider Member Profile is started, a Provider Member Number is assigned and the list of steps in the Provider Member Enrollment Process is built for the Provider Member Candidate. As the Provider is shepherded through the enrollment process, CSRs use the Provider Member Candidate Enrollment Process Tracking page to record the date and time of completion of the various steps. After the Provider has completed all the steps in the enrollment process, a Master CSR records the completion of the final step. The system then records the Provider as an active Provider Member and sends an initial set of Provider Member information to the VISA DPS ePay System.

Providers may contact a TPN CSR either by calling the telephone number on the Contact Us Web page and the How to Become a Member Provider page, or by submitting an email inquiry via the Contact Us page. A CSR working with a Provider will follow the documented process for initial Provider contacts.

TPN will use a variety of marketing techniques to identify providers who are potential Provider Member Candidates including receiving a list of participating Providers from the Payer Member and via query tools into the Rejected 835 Database.

As Providers contact TPN, the CSRs will follow the documented process for initial Provider contacts.

A Provider Member Candidate contacts TPN to begin the Provider Member Enrollment Process. A CSR begins the enrollment process by entering basic information into the Provider Member Profile Database via the Provider Member Profile Add Page. A new Provider Member Profile is started, a Provider Member Number is assigned and the list of steps in the Provider Member Enrollment Process is built for the Provider Member Candidate.

A critical, early criterion for becoming a Provider Member is whether the Candidate Member banks at a VISA DPS ePay member bank. If not, the Candidate Member cannot become a Provider Member until it opens an account at a VISA DPS ePay member bank. The determination is done outside of the TPN hPay Solution System.

The CSR offers to send to the Candidate Member the list of VISA DPS member banks so that if the Candidate Member chooses to pursue membership further, it can open an account at a member bank.

As the Provider is shepherded through the enrollment process, CSRs use the Provider Member Candidate Enrollment Process Tracking page to record the date and time of completion of the various steps.

It is anticipated that a contract between TPN and the Provider Member Candidate will be required before the enrollment process begins. A copy of the standard contract is available on the How to Become a Provider Member page. Customer Service can also FAX a copy of the contract to the Provider Member Candidate.

(Page References: Back Office Administrative Web Site/Provider Member Profile Maintenance Page and Provider Member Candidate Enrollment Process Tracking)

The Provider Member Candidate must provide the ABA number of his bank. The Provider Member Candidate sends a voided check or deposit slip to TPN Customer Service. The CSR will use the Provider Member Profile Maintenance page to enter the bank's ABA information from the voided check or deposit slip. (Page References: Back Office Administrative Web Site/Provider Member Profile Maintenance Page and Provider Member Candidate Enrollment Process Tracking)

The CSR will use the Provider Member Profile Maintenance page to enter the Provider Member Candidate's Bank Account information from the voided check or deposit slip. The Provider Member Profile Maintenance page will edit the Bank Account according the criteria for the specific bank. (Page References: Back Office Administrative Web Site/Provider Member Profile Maintenance Page and Provider Member Candidate Enrollment Process Tracking)

The TPN Provider Maintenance File (TPMF) is intended to notify the VISA DPS ePay System of a change to Provider Member information: new Provider Members ("adds"), changes to specific Provider Members ("replaces") or removals of existing Provider Members ("deletes").

The VISA DPS ePay System will receive from the TPN hPay Solution System the TPMF and update its internal files with the new information provided by the TPN hPay Solution System. The VISA DPS ePay System will transmit to the TPN hPay Solution System the TPAF.

The Provider Master User and all the Provider Users who have access to the Provider's information must be trained in the use of the system. Further, various HIPAA regulations require training of personnel in security and access control.

It requires the specific approval of three organizations to enable a Provider Member's claim payments to be processed through the TPN Shared Funds Movement Process: the VISA DPS ePay System signals its approval when it transmits a record in the TPAF that shows it accepted and processed the Provider Member's Profile information; the Provider Member signals its approval when it completes all necessary training, has provided all the necessary information and verbally confirms its readiness; and the TPN hPay Solution System signals its approval when all steps in the Provider Member Enrollment Process are completed and a Master CSR sets the Active/Inactive flag in the Provider Profile Database to "ACTIVE".

Figure 18:
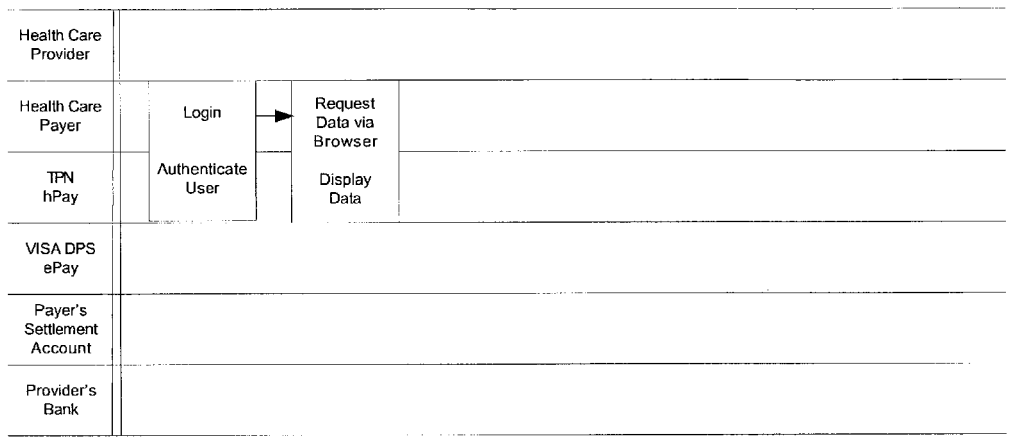

FIG. 18 is Cross-Functional Process Map that illustrates the Payer Query and Reporting Sub-Process.

Payer Users and Payer Master Users can retrieve standard reports from the TPN hPay Solution System via an Internet browser.

The Anonymous User uses an Internet browser to access the Login page at TPNhPay.com and attempts to login.

The Login page attempts to authenticate the user. If successful, the user is authenticated as a Payer User.

The Payer User accessed Payer Member Query Page and enters the required parameters into the text boxes.

The Payer Member Query Page displays the data per the parameters entered by the Payer User.

Figure 19:
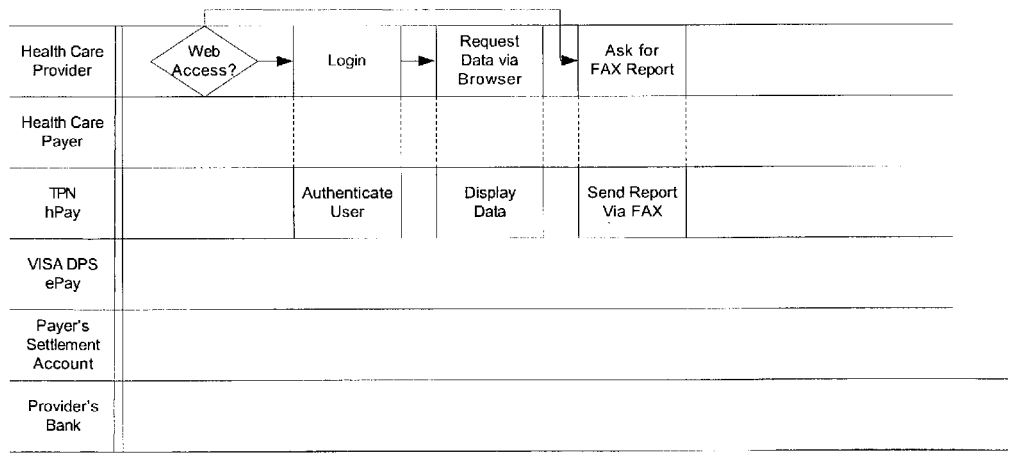

FIG. 19 is a Cross-Functional Process Map that illustrates the Provider Query and Reporting Sub-Process.

Provider Users and Provider Master Users can retrieve standard reports from the TPN hPay Solution System by one of two ways: on-line via an Internet browser or by callback FAX.

During the Provider Member Enrollment Process, the Provider Member decided whether to have the ability to retrieve reports on-line or via FAX.

The Provider User dials the telephone number for the TPN FAX Report Voice Response Unit (VRU). The VRU prompts for a User ID. The Provider User types in his User ID. If not valid, the VRU issues a message and prompts the Provider User to re-try.

If valid, the VRU prompts for a Password. The Provider User types in his Password. If not valid, the VRU issues a message and prompts the Provider User to re-try.

If valid, the VRU prompts for a FAX Telephone Number. The Provider User types in his FAX Telephone Number. If it does not match the FAX Telephone Number in the Provider Member Profile Database, the VRU issues a message and prompts the Provider User to re-try.

If it matches the FAX Telephone Number in the Provider Member Profile Database, the VRU prompts the Provider User for a number of days, between 1 and 7, of Settlement Reports. If not a valid number, the VRU issues a message and prompts the Provider User to re-try.

If valid, the VRU thanks the Provider User and states that the reports will be sent shortly.

The VRU sends a report request to the Report Server. The Report Server generates the set of Settlement Reports for the number of days requested, where day "1" is the most recent Settlement Report available and day "2" is the day prior to that. The Report Server forwards a FAX requests and the set of reports to the FAX Server. The FAX Server, using store and forward capabilities, attempts, until successful, to FAX the set of reports to the Provider's FAX Telephone Number.

The Anonymous User uses an Internet browser to access the Login page at TPNhPay.com and attempts to login.

The Login page attempts to authenticate the user. If successful, the user is authenticated as a Provider User.

The Provider User accessed Provider Member Query Page and enters the required parameters into the text boxes.

The Provider Member Query Page displays the data per the parameters entered by the Provider User.

The TPNhPay.com web site consists of four separate areas.

The first is a brochure site accessible to the general Internet public, or "anonymous users". This area, the TPN hPay Brochure Site, contains information about TPN that is intended to inform the public.

Figure 20:
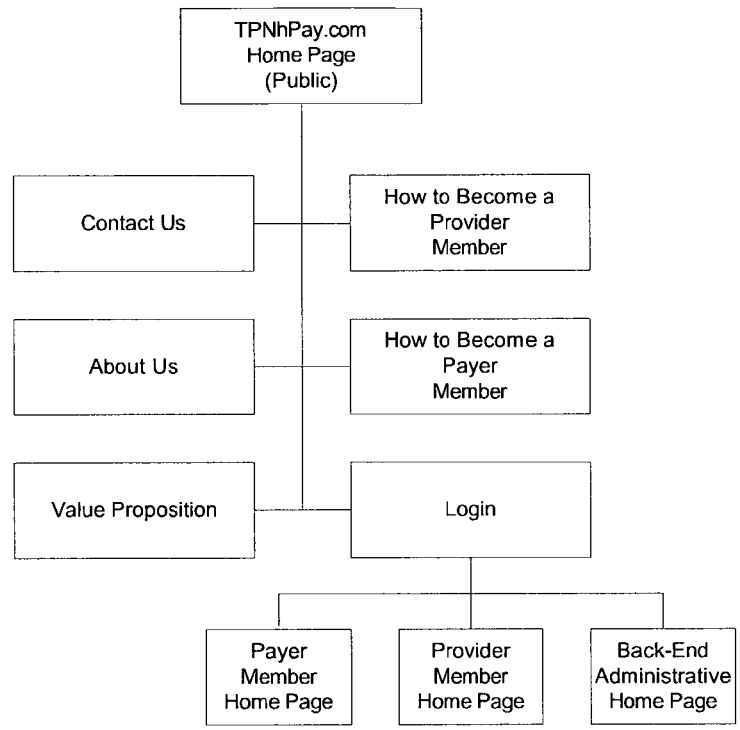

FIG. 20 is a chart that illustrates the TPNhPay.com Brochure Site.

The second is a secured site accessible to authenticated Provider Users. This area, the Provider Site, contains the pages that allow Provider Member organizations to access the data about payments from Payer Members.

Figure 21:
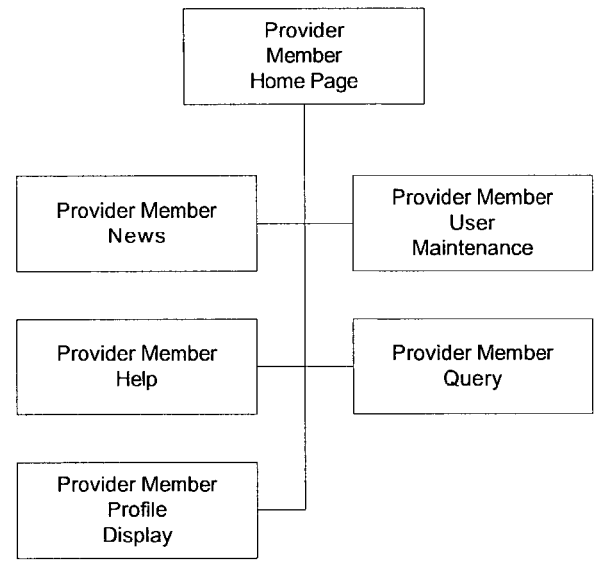

FIG. 21 is a chart that illustrates the Provider Site.

The third is a secured site accessible to authenticated Payer Users. This area, the Payer Site, contains the pages that allow Payer Member organizations to access the data about payments made to Provider Members.

Figure 22:
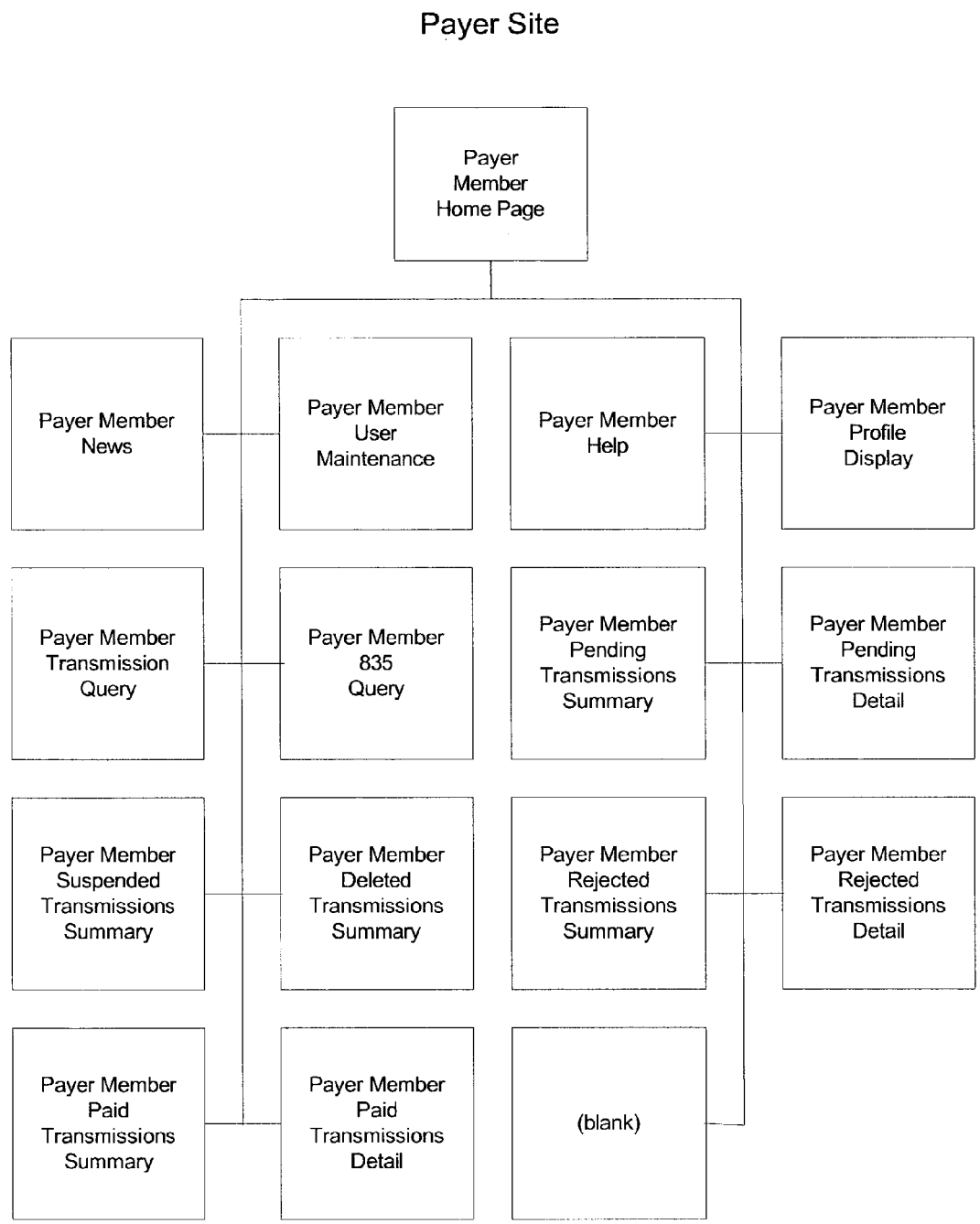

FIG. 22 is a chart that illustrates the Payer Site.

The fourth is a secured site accessible to authenticated TPN CSRs. This area, the Back-End Admin Site, contains the pages that allow TPN CSRs to access the data about Provider Members, Payer Members, TPN processes and claim payments.

Figure 23:
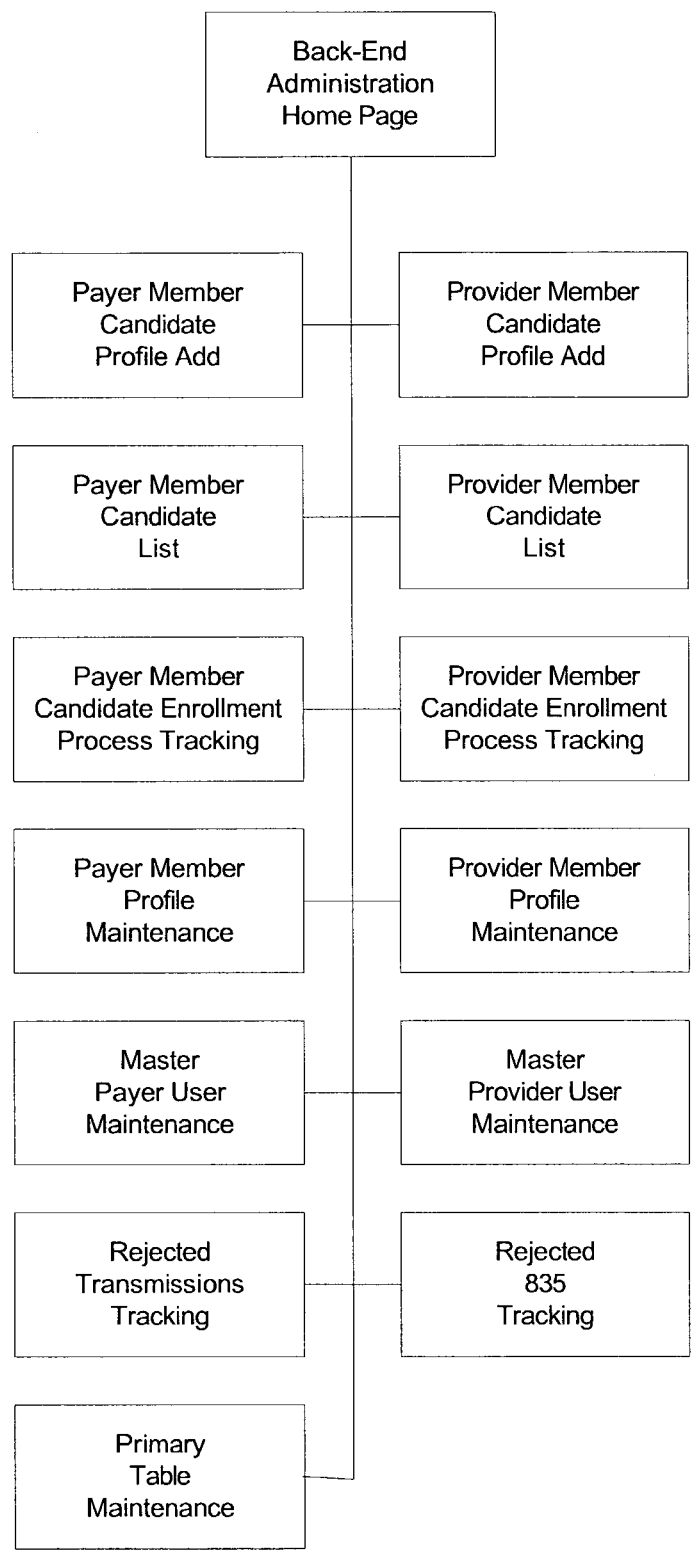

FIG. 23 is a chart that illustrates the Back-End Admin Site.

The following paragraphs describe the pages of the four web sites.

The purpose of the Brochure Web site is to provide an entry point or "portal" through which individuals can glean information about TPN and hPay. Anonymous users, those who have not previously registered with hPay, are able to access nonsensitive, publicly available information: press releases, company contact information, etc. Payer non-members and provider non-members can learn about the hPay products, tools and processes, can initiate contact with hPay and can begin to understand the value that hPay membership provides. The hPay portal serves as an extension of hPay's marketing efforts, reaching potential members at almost no incremental cost.

Further, the existence of a professional, engaging and informative Brochure Web site reassures potential members contacted by hPay's sales and marketing teams that TPN is an on-going concern and that the TPN hPay Solution System is a legitimate product. Many, if not most, potential members will rely on the content of the Brochure Web site and it's professional appeal as part of their "due diligence" process before deciding whether to join the hPay member community.

For hPay members, whether they are Providers or Payers, the Brochure Site is their entry point into The TPN hPay Solution System. At a minimum, members will need a URL that is easy to remember when they need to access hPay from somewhere other than their normal work location. And that URL, "www.TPNhPay.com" needs to deliver an initial familiar look that reassures the member that he has found hPay.

Each page within the TPN Brochure Web Site maintains a consistent layout and "look and feel." The page layout consists of five key elements: the title bar, the page header, the navigation system, the page body, and the page footer.

The title bar/page header includes a logo, which is a hyperlink to the home page from elsewhere in the site and tabs that link to the five principal sections of the Web site: Contact Us, About Us, How to Become a Payer Member, How to Become a Provider Member, Value Proposition and Login. This title bar/page header is identical throughout the site. Each of the five tabs represents a main section of the site, and provides access to the content, functions and options that fall within that section. Some functionality and content may appear in more than one of the five sections. When the user clicks one of these tabs, the appropriate content is displayed and the tab is color-highlighted. This functionality allows the user to navigate quickly between the main sections of the site and easily identify the currently displayed section (the multi-look graphic design process may produce a navigation system other than tabs, but the same underlying principles will apply).

A navigation path also appears on the page, beneath the title bar/page header. The navigation path keeps track of the user's current location within the site by displaying the location of the current page within the site's page hierarchy. For instance, if the user navigates to the Contact Us page, the navigation path reads, "HOME: CONTACT US." With the exception of the currently displayed page, each page name in the navigation path is a hyperlink, allowing the user to easily navigate back through the site. The navigation path appears on every page.

The navigation system consists of the tabs, buttons and hyperlinks that allow the user to navigate through the site. The navigation elements included on the title bar/page header, and the page footer appear in the same place on every page. This consistency allows the user to easily master the basic site navigation. Some pages may offer additional navigational tools, such as the navigation menu in the About Us section, which allows users to navigate between the different documents available on-line. When a navigation menu is included, it appears on the left side of the page below the page header.

The page body is the largest area of the page. The body is where text, products, images, forms, tables and other page content appear. The layout of the body content may vary from page to page, but consistency is achieved by using standard fonts and colors throughout the site. Navigational tools like hyperlinks and buttons may also appear within the page body.

The page footer is a set of hyperlinks that appear in a consistent format at the bottom of every page. These links direct the user to pages of site-wide interest, like the Site Map, E-mail this Page to a Friend, and Security and Privacy pages.

The Home page will contain general marketing and background information intended for anonymous users. The text and content of this page will be provided by and maintained by TPN via a content manager tool.

The Contact Us page contains text information with the telephone numbers, addresses and/or email addresses of various TPN organizations or individuals. The text and content of this page will be provided by and maintained by TPN via a content manager tool.

The Contact Us page will also contain an area into which a user may enter information that will be emailed back to a single address within TPN. Text entry boxes on the page contain areas for the user to enter name(*), organization(*), telephone number(*), mailing address, email address and a 256-character maximum message. Fields that are required are annotated with an "*". Once the user fills in the required information and clicks the "submit" button, an email is sent to a single TPN address, to be specified by TPN.

The About Us page contains information descriptive of the TPN organization. It will be further divided into content areas by a submenu, accessible via a navigation bar on the left side of the page. The subdivided content will be Corporate Officers and Press Releases.

By clicking on one of the content area links in the navigation bar, the system will display the appropriate content. The text and content of this page will be provided by and maintained by TPN via a content manager tool.

The How to Become a Payer Member page describes the process by which an interested Payer becomes a Payer Member. The text of this page will be provided by and maintained by TPN via a content manager tool.

The How to Become a Provider Member page describes the process by which an interested Provider becomes a Provider Member. The text of this page will be provided by and maintained by TPN via a content manager tool.

A button on the page will link to an online copy of the standard contract between TPN and the Provider Member. Provider Member Candidates may print the contract for their investigation and, eventually, to begin the enrollment process.

The Value Proposition page explains the value of becoming a Provider Member and Payer Member of TPN. The text and content of this page will be provided by and maintained by TPN via a content manager tool.

The Login page will be the single point at which an individual User is authenticated. While the page is available to any anonymous user, only authenticated Payer Users will be authorized to view the following pages: Payer Member Home Page, Provider Member Home Page, and Back-End Administrative Home Page.

The Payer Member Login page will display text areas into which the anonymous user enters the Member User Id and Password. After the anonymous user clicks the "login" button, the system authenticates the User Id and Password. If the User Id and Password are valid, the system takes the following actions.

It determines whether the user is in the Provider member class, Payer Member class or Back-End Administrative class; it determines whether the user is a "normal" user within the class or is a Master User; it assigns the appropriate authority to the authenticated user; and it displays the home page for the class.

If the User Id and Password entered are not valid, the system displays a generic error message and redisplays the text areas into which the anonymous user enters the Member User Id and Password. If the anonymous user is unsuccessful in three consecutive attempts, the system takes the appropriate protective measures:

If the anonymous user is unsuccessful in logging in because the User ID failed to match at all, the system places a cookie on the user's computer that prevents the user from attempting another login for 15 minutes (probably by disabling the display of the login page).

If the anonymous user is unsuccessful in logging in because the Password failed to match for a matched User ID, the system sends an email to the TPN security officer email box notifying him of the repeated attempts for login.

If the anonymous user cancels login, the system will return the anonymous user to the Provider Member Home Page.

The initial access point to all TPN Provider-related activities is the Provider Member Web Site accessible via the "Login" button on the TPNhPay.com Home Page. Upon successful authentication, the Provider User will be presented with a Provider Member Home Page from which the Provider User can access news, obtain help, update his profile or query the database.

The Provider Member Home page contains a welcome message, a tip of the day, a security reminder and buttons to: Provider Member News, Provider Member Help, Provider Member Profile Display, Provider Member User Maintenance, and Provider Member Query.

The TPN Customer Service Team with information useful to Provider Members updates the Provider Member News page frequently with helpful hints on using the Web site, notification of changes, and frequently asked questions.

The Provider Member Help page is a resource to Provider Users when help is needed or desired. The page will be maintained by the TPN Customer Service Team and will contain contact names and phone numbers for the TPN Customer Service Team and frequently asked questions.

The Provider Member Profile Display page is accessible only by Master Provider Users. The page displays the following information related to the Provider Member and is drawn from the Provider Profile Database: Name of organization, Remittance address information including street, city, state and zip, Physical address information including street, city, state and zip, Primary contact name, telephone number and email, Time zone of primary contact, FAX telephone number, Federal tax identification number, Provider's Bank name, Provider's Bank Account number, and Providers' Merchant Category Code.

All fields are the same length and type as specified in the TPN Provider Maintenance File, Appendix F. This is a query-only page. A message will be displayed on the page that directs the Provider Master User to call TPN Customer Service to coordinate changes to the data.

The Provider Member User Maintenance page is accessible only to Master Provider Users. The page allows a Master Provider User to add new, change or delete existing Provider Users. When the Master Provider User accesses the page, the system displays an "Add a User" section at the top of the page and a "Change/Delete a User" section below it.

The "Add a User" section displays text boxes for the following, required information: New Provider User's Last name, first name, middle initial, work telephone number, and Primary Provider Member's ID; and Master Provider User's ID and password.

When the Master Provider clicks the "submit" button, the system confirms all required information is present and passes the edit criteria and reauthenticates the Master Provider. The system checks that the Primary Provider Member ID entered is on the list of Provider Member IDs for which the Master Provider User is authorized. If any condition fails, the system issues an error message and the new Provider User is not created. If all the conditions pass, the system displays the new Provider User's system generated ID and password.

The User ID issued by the system will be a 16-digit number conforming to the ISO standard for identification card numbers (ISO standards 7811-7813). The password will be a system-generated 8-digit number.

The "Change/Delete a User" section displays, in Provider User Last Name sequence, the following information, in overwritable text boxes, one row per current, active Provider User for all the Provider Members of the Master Provider User: a "Change" radio button; a "Delete" radio button; Provider User's: last name, first name, middle initial; work telephone number; ID; Password (8-digits); the list of Provider Member IDs for which the Provider User has authority; and five empty text boxes for the entry of more Provider Member IDs.

At the bottom of the section is a "Make Changes" button which, when clicked, results in the following activity:

For any row that has the radio button for "Change" clicked, the system checks that any new Provider Member IDs entered are on the list of Provider Member IDs for which the Master Provider User is authorized and, if so, the system will update the Provider User Security Table with any field that changed.

For any row which has the radio button for "Delete" clicked, the system will display an "Are you sure you want to delete this user?" dialogue. If the Master User clicks "Yes", the Provider User is deleted from the Provider User Security Table.

The Provider Member Query page allows Provider Users query access to the Payment Data. All reports will be delivered to the page as an HTML document. Specifically, the reports will not be in a downloadable or importable format.

The Provider User will be able to specify the following selection criteria: the Settlement Dates between a date range, inclusive (i.e., FROM date to TO date); or, the Settlement Dates for the previous N days, inclusive of "today".

Once the Provider User has clicked the "submit" button and the system has validated the date entries for conflict, format, validity, sequence and range, the system will display, in a tabular format with the following fields: Settlement Date (sort able); Payer Identification Number (sort able); Payer Name (sort able); Claim Number (sort able); Patient Name (sort able); Claim Date (sort able); Claim Amount; Electronic Funds Transfer Number; Payment Amount; and TPN Fee Amount.

"Sort able" indicates a column that is available as the single sort sequence available to the Provider User. The Provider User chooses a sort sequence by clicking the ascending ("^") button or the descending ("v") button above the column header. When a sort button is clicked, the system will redisplay the results of the search from the selection criteria sorted in either ascending or descending order on the column chosen by the Provider User.

The Provider User will use the browser's "print" button to print the page.

The first page on the Payer Web Site is Payer Member News.

The TPN Customer Service Team with information useful to Payer Members updates the Payer Member News page frequently: Helpful hints on using the Web site; Notification of changes; and Frequently asked questions.

The Payer Member Help page will contain information intended to assist a Payer Member who needs assistance, has a question or is otherwise unable to perform his functions.

The Payer Member Profile page is accessible only to Master Payer Users. The page displays, in prepopulated text boxes, the following information related to the Payer Member: Payer Name, Payer Physical Address, Payer Contact Name, Payer Contact Phone Number, Payer Mailing Address, Payer Facsimile Phone Number. The Master Payer User is allowed to key over any and all information displayed. If the Master Payer User clicks the "update information" button, the system overwrites the appropriate Payer Profile database fields with the information in the text box.

The Payer Member User Maintenance page is accessible only to Master Payer Users. The page allows a Master Payer User to add new, change or delete existing Payer Users. When the Master Payer User accesses the page, the system displays an "Add a User" section at the top of the page and a "Change/Delete a User" section below it.

The "Add a User" section displays text boxes for the following, required information: New Payer User's last name, first name, middle initial, work telephone number and Primary Payer Member's ID; Master Payer User's ID and Password.

When the Master Payer clicks the "submit" button, the system confirms all required information is present and passes the edit criteria and reauthenticates the Master Payer. The system checks that the Primary Payer Member ID entered is on the list of Payer Member IDs for which the Master Payer User is authorized. If any condition fails, the system issues an error message and the new Payer User is not created. If all the conditions pass, the system displays the new Payer User's system generated ID and password.

The User ID issued by the system will be a 16-digit number conforming to the ISO standard for identification card numbers (ISO standards 7811-7813). The password will be a system-generated 8-digit number.

The "Change/Delete a User" section displays, in Payer User Last Name sequence, the following information, in overwritable text boxes, one row per current, active Payer User for all the Payer Members of the Master Payer User: a "Change" radio button; a "Delete" radio button; and Payer User's: last name, first name, middle Initial, work telephone number, ID, Password (8-digits), the list of Payer Member IDs for which the Payer User has authority, and five empty text boxes for the entry of more Payer Member IDs.

At the bottom of the section is a "Make Changes" button which, when clicked, results in the following activity:

For any row that has the radio button for "Change" clicked, the system checks that any new Payer Member IDs entered are on the list of Payer Member IDs for which the Master Payer User is authorized and, if so, the system will update the Payer User Security Table with any field that changed.

For any row which has the radio button for "Delete" clicked, the system will display an "Are you sure you want to delete this user?" dialogue. If the Master User clicks "Yes", the Payer User is deleted from the Payer User Security Table.

The Payer Member Query page is accessible to Master Payer Users and Payer Users. The page is laid out as displayed below:

The Payer Member Transmission Detail page is accessible to Master Payer Users, Payer Users and all CSR Users. The page displays, for a single Payer Member, a single Transmission regardless of the Transmission's state. While the final layout of the page is yet to be determined, it is anticipated that the page will display the following.

At the top of the page, a text box into which the Payer User enters the Payer Member ID (tentatively it's Federal Tax ID), the Transmission Interchange Control Number and an "enter" button;

In the body of the page: the VISA DPS ePay System processing date; the Transmission's state; information from the ISA segment (to be determined); and information from the GS segment (to be determined).

Followed by, one line per 835: information from the ST segment (to be determined); the 835s state; information from the BPR segment (to be determined); information from the TRN segment (to be determined); information from the Loop 1000B, N1 segment (to be determined); and a "select" checkbox.

At the bottom of the page, below all Transmissions displayed: the count of 835s displayed above; the Grand Total of all the 835s BPR02 Monetary Amounts displayed above; and information from the PLB segment (to be determined).

When the User selects an 835 by clicking the "select" checkbox, the TPN hPay Solution System displays the "Payer Member 835 Detail" page, prepopulated with the search criteria for the 835 selected.

The Payer Member 835 Detail page is accessible to Master Payer Users, Payer Users and all CSR Users. The page displays, for a single Payer Member, a single 835 regardless of the 835s state. While the final layout of the page will be determined in the Design Phase, it is anticipated that the page will display the following.

At the top of the page, a text box into which the Payer User enters the Payer Member ID (tentatively its Federal Tax ID), the Transmission Interchange Control Number, the Transaction Set Control Number and an "enter" button.

In the body of the page: the VISA DPS ePay System processing date; the 835s state; information from the ST segment (to be determined); information from the BPR segment (to be determined); information from the TRN segment (to be determined); and information from the Loop 1000B, N1, N3, N4 segments (to be determined).

Followed by, one line per Claim (LOOP 2100): information from the CLP segment (to be determined); and information from the CAS segment (to be determined).

At the bottom of the page, below all Claims displayed: the count of Claim's displayed above; the Grand Total of all the Claim's CLP and CAS Monetary Amounts displayed above; and information from the PLB segment (to be determined).

The Payer Member Pending Transmissions Summary page is accessible to Master Payer Users, Payer Users and all CSR Users. The page displays, for a single Payer Member, all Transmissions that are held by the VISA DPS ePay System pending a wire transfer to the Payer Member's Settlement Account of sufficient funds to cover the total amount of the non-rejected 835s within the Transmission. These are Transmissions whose state is "PENDING". While the final layout of the page will be determined in the Design Phase, it is anticipated that the page will display the following.

At the top of the page, a text box into which the Payer User enters the Payer Member ID (tentatively its Federal Tax ID) and an "enter" button.

In the body of the page, one line per Transmission: the VISA DPS ePay System processing date (primary sort, ascending); the Transmission Interchange Control Number (secondary sort, ascending); the total amount of all the 835s BPR02 Monetary Amounts; the total amount of all the Rejected 835s BPR02 Monetary Amounts; the total amount of all the Pending 835s BPR02 Monetary Amounts; and a "select" checkbox.

At the bottom of the page, below all Transmissions displayed: the count of Transmissions displayed above; the Grand Total of all the 835s BPR02 Monetary Amounts of all Transmissions displayed above; the Grand Total of all the Rejected 835s BPR02 Monetary Amounts of all Transmissions displayed above; and the Grand Total of all the Pending 835s BPR02 Monetary Amounts of all Transmissions displayed above.

When the User selects a Transmission by clicking the "select" checkbox, the TPN hPay Solution System displays the "Payer Member Pending Transmission Detail" page, prepopulated with the search criteria for the Transmission selected.

The Payer Member Pending Transmission Detail page is accessible to Master Payer Users, Payer Users and all CSR Users. The page displays, for a single Transmission, all 835s that are held by the VISA DPS ePay System pending a wire transfer to the Payer Member's Settlement Account of sufficient funds to cover the total amount of the non-rejected 835s within the Transmission. These are 835s whose state is "PENDING" or "REJECTED". While the final layout of the page will be determined in the Design Phase, it is anticipated that the page will display the following.

At the top of the page, the Transmission Interchange Control Number and the VISA DPS ePay System processing date;

In the body of the page, one line per 835 within the Transmission: the Transaction Set Control Number (primary sort, ascending); the 835s BPR02 Monetary Amount; if a Rejected 835, the 835s BPR02 Monetary Amounts; if a Pending 835, the 835s BPR02 Monetary Amounts and a "select" checkbox.

At the bottom of the page: the count of 835s displayed above; the Grand Total of all the 835s BPR02 Monetary Amounts of all 835s displayed above; the Grand Total of all the Rejected 835s BPR02 Monetary Amounts of all 835s displayed above; and the Grand Total of all the Pending 835s BPR02 Monetary Amounts of all 835s displayed above.

When the Payer User selects an 835 by clicking the "select" checkbox, the TPN hPay Solution System displays the "Payer Member 835 Detail" page, prepopulated with the search criteria for the 835 selected.

The Payer Member Deleted Transmissions Summary page is accessible to Master Payer Users, Payer Users and all CSR Users. The page displays, for a single Payer Member, all Transmissions that have been deleted from the VISA DPS ePay System for the lack of a wire transfer to the Payer Member's Settlement Account of sufficient funds to cover the total amount of the non-rejected 835s within the Transmission. These are Transmissions whose state is "DELETED". While the final layout of the page will be determined in the Design Phase, it is anticipated that the page will display the following.

At the top of the page, a text box into which the Payer User enters the Payer Member TD (tentatively its Federal Tax ID) and an "enter" button;

In the body of the page, one line per Transmission: the VISA DPS ePay System processing date (primary sort, ascending); the Transmission Interchange Control Number (secondary sort, ascending); and the total amount of all the 835s BPR02 Monetary Amounts.

At the bottom of the page, below all Transmissions displayed: the count of Transmissions displayed above; and the Grand Total of all the 835s BPR02 Monetary Amounts of all Transmissions displayed above;

There is no matching "Payer Member Deleted Transmission Detail" page since the Payer Member does not need that detail. They only need to know that the Transmission was deleted.

The Payer Member Suspended Transmissions Summary page is accessible to Master Payer Users, Payer Users and all CSR Users. The page displays, for a single Payer Member, all Transmissions that have been suspended within the VISA DPS ePay System for the lack of a wire transfer to the Payer Member's Settlement Account of sufficient funds to cover the total amount of the non-rejected 835s within the Transmission. These are Transmissions whose state is "SUSPENDED". While the final layout of the page will be determined in the Design Phase, it is anticipated that the page will display the following.

At the top of the page, a text box into which the Payer User enters the Payer Member ID (tentatively its Federal Tax ID) and an "enter" button;

In the body of the page, one line per Transmission: the VISA DPS ePay System processing date (primary sort, ascending); the Transmission Interchange Control Number (secondary sort, ascending); and the total amount of all the 835s BPR02 Monetary Amounts.

At the bottom of the page, below all Transmissions displayed: the count of Transmissions displayed above; and the Grand Total of all the 835s BPR02 Monetary Amounts of all Transmissions displayed above;

There is no matching "Payer Member Suspended Transmission Detail" page since the Payer Member does not need that detail. They only need to know that the Transmission was suspended.

The Payer Member Paid Transmissions Summary page is accessible to Master Payer Users, Payer Users and all CSR Users. The page displays, for a single Payer Member, all Transmissions that generated at least one EFT to a Provider Member. These are Transmissions whose state is "PAID". While the final layout of the page will be determined in the Design Phase, it is anticipated that the page will display the following.

At the top of the page, a text box into which the Payer User enters the Payer Member ID (tentatively its Federal Tax ID), a "starting settlement date" text box, an "ending settlement date" text box, and an "enter" button;

In the body of the page, one line per Transmission: the VISA DPS ePay System Settlement Date (primary sort, ascending); the Transmission Interchange Control Number (secondary sort, ascending); the total amount of all the Paid 835s BPR02 Monetary Amounts; and a "select" checkbox.

At the bottom of the page, below all Transmissions displayed: the count of Transmissions displayed above; and the Grand Total of all the Paid 835s BPR02 Monetary Amounts of all Transmissions displayed above.

When the Payer User selects a Transmission by clicking the "select" checkbox, the TPN hPay Solution System displays the "Payer Member Paid Transmission Detail" page, prepopulated with the search criteria for the Transmission selected.

The Payer Member Paid Transmission Detail page is accessible to Master Payer Users, Payer Users and all CSR Users. The page displays, for a single Transmission, all 835s that generated an EFT to a Provider Member. These are 835s whose state is "PAID". While the final layout of the page will be determined in the Design Phase, it is anticipated that the page will display the following.

At the top of the page, the Transmission Interchange Control Number and the VISA DPS ePay System Settlement Date;

In the body of the page, one line per 835 within the Transmission: the Transaction Set Control Number (primary sort, ascending); the Provider Member's Tax ID, Name, City, State, Zip, the 835s BPR02 Monetary Amount; and a "select" checkbox.

At the bottom of the page: the count of 835s displayed above; and the Grand Total of all the Paid 835s BPR02 Monetary Amounts of all 835s displayed above.

When the Payer User selects an 835 by clicking the "select" checkbox, the TPN hPay Solution System displays the "Payer Member 835 Detail" page, prepopulated with the search criteria for the 835 selected.

The Payer Member Rejected Transmissions Summary page is accessible to Master Payer Users, Payer Users and all CSR Users. The page displays, for a single Payer Member, all Transmissions that contain at least one 835 that was rejected by the VISA DPS ePay System. These are Transmissions whose state may be "PENDING", "REJECTED" or "PAID". While the final layout of the page will be determined in the Design Phase, it is anticipated that the page will display the following.

At the top of the page, a text box into which the Payer User enters the Payer Member ID (tentatively its Federal Tax ID), a "starting settlement date" text box, an "ending settlement date" text box, and an "enter" button;

In the body of the page, one line per Transmission: the VISA DPS ePay System processing date (primary sort, ascending); the Transmission Interchange Control Number (secondary sort, ascending); the Transmission's state and its Reject Reason (if non-blank); the total amount of all the 835s BPR02 Monetary Amounts; the total amount of all the Rejected 835s BPR02 Monetary Amounts; the total amount of all the non-rejected 835s BPR02 Monetary Amounts; and a "select" checkbox.

At the bottom of the page, below all Transmissions displayed: the count of Transmissions displayed above; the Grand Total of all the 835s BPR02 Monetary Amounts of all Transmissions displayed above; the Grand Total of all the Rejected 835s BPR02 Monetary Amounts of all Transmissions displayed above; and the Grand Total of all the non-rejected 835s BPR02 Monetary Amounts of all Transmissions displayed above.

When the Payer User selects a Transmission by clicking the "select" checkbox, the TPN hPay Solution System displays the "Payer Member Rejected Transmission Detail" page, prepopulated with the search criteria for the Transmission selected.

The Payer Member Rejected Transmission Detail page is accessible to Master Payer Users, Payer Users and all CSR Users. The page displays, for a single Transmission, all 835s that generated an EFT to a Provider Member. These are 835s whose state is "PAID". While the final layout of the page will be determined in the Design Phase, it is anticipated that the page will display the following.

At the top of the page, the Transmission Interchange Control Number and the VISA DPS ePay System Settlement Date;

In the body of the page, one line per 835 within the Transmission: the Transaction Set Control Number (primary sort, ascending); the 835s state and its Reject Reason (if non-blank); the 835s BPR02 Monetary Amount; if a Rejected 835, the 835s BPR02 Monetary Amounts; if a non-rejected 835, the 835s BPR02 Monetary Amounts and a "select" checkbox.

At the bottom of the page: the count of 835s displayed above; the Grand Total of all the 835s BPR02 Monetary Amounts of all 835s displayed above; the Grand Total of all the Rejected 835s BPR02 Monetary Amounts of all 835s displayed above; and the Grand Total of all the non-rejected 835s BPR02 Monetary Amounts of all 835s displayed above.

When the Payer User selects an 835 by clicking the "select" checkbox, the TPN hPay Solution System displays the "Payer Member 835 Detail" page, prepopulated with the search criteria for the 835 selected.

The Back-End Administrative Web Site is described in the following paragraphs.

The Payer Member Candidate Profile Add page is accessible only to Master CSRs. The page provides data entry fields for the following information related to the Payer Member Candidate in labeled text boxes, except as noted, and is entered into the Payer Candidate Profile Database: Name of organization, Mailing address information including street, city, state and zip, Physical address information including street, city, state and zip, Primary contact name, telephone number and email, Time zone of primary contact, FAX telephone number and Federal tax identification number.

All fields are the length and type of similar fields in the Provider Member Profile Database. A Master CSR may type in any text box.

A "add member candidate" button is displayed at the bottom of the page. If a Master CSR clicks the "add member candidate" button, the system edit checks all entered fields. For any field that does not pass the edit check, the system displays an error message and takes no further action. Once all fields pass all edits, a new Payer Member Candidate is built in Payer Member Candidate Profile Database with all entered data and the system records the add date and time in the Payer Member Candidate Profile Database. The system also sets the first step ("01") from the Payer Member Candidate Enrollment Process Steps table for the new Payer Member Candidate to complete.

The Payer Member Candidate List page displays the list of Payer Member Candidates who have started but not completed the Payer Member Enrollment Process. For each Payer Member Candidate, the page displays the potential Payer Member's Name (as a link), current process step and current process step start date. If a CSR clicks the Payer Member Candidate's Name, the Payer Member Candidate Enrollment Process Tracking page opens.

The Payer Member Candidate Enrollment Process Tracking page displays the list of steps in the Payer Member Candidate Enrollment Process for a specific Payer Member Candidate. The steps are displayed in the sequence dictated by the Payer Member Candidate Enrollment Process Steps table. For each step, the page shows the date the step started, a checkbox, the name of the CSR who started the step, the date the step completed, a checkbox and the name of the CSR who completed the step. If a step has started, the checkbox is checked. If a step has completed, the checkbox is checked. Otherwise, for steps not started or not completed, the checkbox is unchecked.

If a CSR checks a start step checkbox, the current date is populated in the date the step started field and the CSRs last name and first name are populated in the name field. If a CSR checks a completed step checkbox, the current date is populated in the date the step completed field and the CSRs last name and first name are populated in the name field.

If a CSR unchecks a checked start step or complete step checkbox, the system issues an error message and ignores the action. If a Master CSR unchecks a checked start step or complete step checkbox, the system nulls out the date and name fields.

Any step that has it's Master CSR Authority Required attribute set to "yes" can only be checked or unchecked by a Master CSR.

Step number 99 is reserved for the final step in the Payer Member Enrollment Process and has its Master CSR Authority Required attribute set to "yes". When step number 99 is checked as completed, the system moves the Payer Member's information from the Payer Member Candidate Profile Database to the Payer Member Profile Database and sets a flag to indicate that the Payer Member is active in the system.

The Payer Member Profile Maintenance page is accessible only to CSRs. The page displays the following information related to the Payer Member in labeled text boxes, except as noted, and is drawn from the Payer Profile Database: Name of organization, Mailing address information including street, city, state and zip, Physical address information including street, city, state and zip, Primary contact name, telephone number and email, Time zone of primary contact, FAX telephone number and Federal tax identification number.

A CSR may type over any field in a text box or check/uncheck any radio button. Deletions are characterized by overtyping all blanks in the text box.

A "make changes" button is displayed at the bottom of the page. If a CSR clicks the "make changes" button, the system edit checks all entered fields. For any field that does not pass the edit check, the system displays an error message and takes no further action. Once all fields pass all edits, the Payer Member Profile Database is updated with any field that changed and the system sets the Last Action field to "CHG" and the Last Action Date to the current date.

The Master Payer User Maintenance page is accessible only to Master CSRs. The page allows a Master CSR to add new, change or delete existing Master Payer Users. When the Master CSR accesses the page, the system displays an "Add a Master Payer User" section at the top of the page and a "Change/Delete a Master Payer User" section below it.

The "Add a Master Payer User" section displays text boxes for the following, required information: New Master Payer User's last name, first name, middle initial, work telephone number and Primary Payer Member's ID; Master CSRs ID and Password.

When the Master CSR clicks the "submit" button, the system confirms all required information is present and passes the edit criteria and reauthenticates the Master CSR. If any condition fails, the system issues an error message and the new Master Payer User is not created. If all the conditions pass, the system displays the new Master Payer User's system generated ID and password.

The User ID issued by the system will be a 16-digit number conforming to the ISO standard for identification card numbers (ISO standards 7811-7813). The password will be a system-generated 8-digit number. (Issue: how does the user change the password later?)

The "Change/Delete a Master Payer User" section displays, in Master Payer User Last Name sequence, the following information, in overwritable text boxes, one row per current, active Master Payer User: a "Change" radio button; a "Delete" radio button; and Master Payer User's: last name, first name, middle initial; work telephone number; Primary Payer Member name (primary sort, ascending); Primary Payer Member ID; ID; Password (8-digits); the list of Payer Member IDs for which the Master Payer User has authority; and five empty text boxes for the entry of more Payer Member IDs.

At the bottom of the section is a "Make Changes" button which, when clicked, results in the following activity.

For any row that has the radio button for "Change" clicked, the system checks that any new Payer Member IDs entered are valid and, if so, the system will update the Master Payer User Security Table with any field that changed.

For any row which has the radio button for "Delete" clicked, the system will display an "Are you sure you want to delete this user?" dialogue. If the Master CSR clicks "Yes", the Master Payer User is deleted from the Master Payer User Security Table.

The Provider Member Candidate Profile Add page is accessible only to CSRs. The page provides data entry fields for the following information related to the Provider Member Candidate in labeled text boxes, except as noted, and is entered into the Provider Member Candidate Profile Database: Name of organization, Remittance address information including street, city, state and zip, Physical address information including street, city, state and zip, Primary contact name, telephone number and email, Time zone of primary contact, FAX telephone number, Federal tax identification number, Provider's Bank name (as a drop-down menu from the ePay Banks Table), Provider's Bank Account number, A button labeled "Edit Bank Account Number", and Providers' Card Acceptor Business Code (as a drop-down menu from the Providers Card Acceptor Business Codes Table).

All fields are the length and type as specified in the TPN Provider Maintenance File, Appendix F. A CSR may type in any text box.

If the CSR clicks the "Edit Bank Account Number" the system compares the form and format of the Bank Account Number to the approved form and format of Bank Account Numbers from the bank specified in the Provider's Bank name field and displays a message indicating whether the Bank Account Number conforms to the edit criteria.

A "add member candidate" button is displayed at the bottom of the page. If a CSR clicks the "add member candidate" button, the system edit checks all entered fields. For any field that does not pass the edit check, the system displays an error message and takes no further action. Once all fields pass all edits, a new Provider Member Candidate is built in Provider Member Candidate Profile Database with all entered data and the system records the add date and time in the Provider Member Candidate Profile Database. The system also sets the first step ("01") from the Provider Member Candidate Enrollment Process Steps table for the new Provider Member Candidate to complete.

The Provider Member Candidate List page displays the list of Provider Member Candidates who have started but not completed the Provider Member Candidate Enrollment Process. For each Provider Member Candidate, the page displays the potential Provider's Name (as a link), current process step and current process step start date. If a CSR clicks the Provider Member Candidate's Name, the Provider Member Candidate Enrollment Process Tracking page opens.

The Provider Member Candidate Enrollment Process Tracking page displays the list of steps in the Provider Member Enrollment Process for a specific Provider Member Candidate. The steps are displayed in the sequence dictated by the Provider Member Candidate Enrollment Process Steps table. For each step, the page shows the date the step started, a check box, the name of the CSR who started the step, the date the step completed, a checkbox and the name of the CSR who completed the step. If a step has started, the checkbox is checked. If a step has completed, the checkbox is checked. Otherwise, for steps not started or not completed, the checkbox is unchecked.

If a CSR checks a start step checkbox, the current date is populated in the date the step started field and the CSRs last name and first name are populated in the name field. If a CSR checks a completed step checkbox, the current date is populated in the date the step completed field and the CSRs last name and first name are populated in the name field.

If a CSR unchecks a checked start step or complete step checkbox, the system issues an error message and ignores the action. If a Master CSR unchecks a checked start step or complete step checkbox, the system nulls out the date and name fields.

Any step that has it's Master CSR Authority Required attribute set to "yes" can only be checked or unchecked by a Master CSR.

Step number 99 is reserved for the final step in the Provider Member Candidate Enrollment Process and has its Master CSR Authority Required attribute set to "yes". When step number 99 is checked as completed by a Master CSR, the system sets the Last Action field to "ADD" and the Last Action Date to the current date. The TPN hPay Solution System then moves the Provider Member's information from the Provider Member Candidate Profile Database to the Provider Member Profile Database and sets the trigger for the TPN Provider Maintenance File (TPMF) Extract and Export process to send the new Provider Member information to the VISA DPS ePay System.

The Provider Member Profile Maintenance page is accessible only to CSRs. The page displays the following information related to the Provider Member in labeled text boxes, except as noted, and is drawn from the Provider Profile Database: Name of organization, Remittance address information including street, city, state and zip, Physical address information including street, city, state and zip, Primary contact name, telephone number and email, Time zone of primary contact, FAX telephone number, Federal tax identification number, Provider's Bank name (as a drop-down menu from the ePay Banks Table), Provider's Bank Account number, A button labeled "Edit Bank Account Number", Providers' Card Acceptor Business Code (as a drop-down menu from the Providers Card Acceptor Business Codes Table), For each of the seven days of the week, the preferred time (hour and minute) to receive any FAX transmissions, and A button to indicate whether the provider wishes to receive faxes on the published Federal Holidays.

All fields are the length and type as specified in the TPN Provider Maintenance File, Appendix F. A CSR may type over any field in a text box or check/uncheck any radio button. Deletions are characterized by overtyping all blanks in the text box.

If the CSR clicks the "Edit Bank Account Number" the system compares the form and format of the Bank Account Number to the approved form and format of Bank Account Numbers from the bank specified in the Provider's Bank name field and displays a message indicating whether the Bank Account Number conforms to the edit criteria.

A "make changes" button is displayed at the bottom of the page. If a CSR clicks the "make changes" button, the system edit checks all entered fields. For any field that does not pass the edit check, the system displays an error message and takes no further action. Once all fields pass all edits, the Provider Profile Database is updated with any field that changed and the system sets the Last Action field to "CHG" and the Last Action Date to the current date. This sets the trigger for the TPN Provider Maintenance File (TPMF) Extract and Export process to send the new Provider Member information to the VISA DPS ePay System.

The Master Provider User Maintenance page is accessible only to Master CSRs. The page allows a Master CSR to add new, change or delete existing Master Provider Users. When the Master CSR accesses the page, the system displays an "Add a Master Provider User" section at the top of the page and a "Change/Delete a Master Provider User" section below it.

The "Add a Master Provider User" section displays text boxes for the following, required information: New Master Provider User's last name, first name, middle initial, work telephone number and Primary Provider Member's ID; Master CSRs ID and Password.

When the Master CSR clicks the "submit" button, the system confirms all required information is present and passes the edit criteria and reauthenticates the Master CSR. If any condition fails, the system issues an error message and the new Master Provider User is not created. If all the conditions pass, the system displays the new Master Provider User's system generated ID and password.

The User ID issued by the system will be a 16-digit number conforming to the ISO standard for identification card numbers (ISO standards 7811-7813). The password will be a system-generated 8-digit number. (Issue: how does the user change the password later?)

The "Change/Delete a Master Provider User" section displays, in Master Provider User Last Name sequence, the following information, in overwritable text boxes, one row per current, active Master Provider User: a "Change" radio button; a "Delete" radio button; and Master Provider User's: last name, first name, middle initial, work telephone number, Primary Provider Member name (primary sort, ascending), Primary Provider Member ID, ID, Password (8-digits), the list of Provider Member IDs for which the Master Provider User has authority, and five empty text boxes for the entry of more Provider Member IDs.

At the bottom of the section is a "Make Changes" button which, when clicked, results in the following activity.

For any row that has the radio button for "Change" clicked, the system checks that any new Provider Member IDs entered are valid and, if so, the system will update the Master Provider User Security Table with any field that changed.

For any row which has the radio button for "Delete" clicked, the system will display an "Are you sure you want to delete this user?" dialogue. If the Master CSR clicks "Yes", the Master Provider User is deleted from the Master Provider User Security Table.

The Rejected Transmission Tracking page is accessible only to CSRs. The page will display all rejected transmissions whose state is "open" in Payer sequence by processing date. For each rejected transmission, the system displays: the appropriate information needed to uniquely identify the transmission; the reject code and reason; the following three events: Transmission received date and time, Payer notification started date and time and CSR ID, and Provider notification started date and time and CSR ID; and an "update" button.

CSRs are able to enter the dates and times of the notification start and completed events. When the CSR clicks the "update" button, the system updates the Rejected Transmission Database and automatically populates the CSR ID. When the Payer notification completed date and time are provided, the system sets the rejected transmission state to "closed" and the systems sets the rejected 835 state to "closed" in the Rejected 835 Database for every 835 that was contained in the rejected transmission.

The Rejected 835 Tracking page is accessible only to CSRs. The page will display all rejected 835s which were not part of a rejected transmission and whose state is "open" in Payer sequence by processing date. For each rejected 835, the system displays: the appropriate information needed to uniquely identify the transmission and the 835; the reject code and reason; the following three events: 835 received date and time, Payer notification started date and time and CSR ID, and Provider notification started date and time and CSR ID; and an "update" button.

CSRs are able to enter the dates and times of the notification start and completed events. When the CSR clicks the "update" button, the system updates the Rejected 835 Database and automatically populates the CSR ID. When the Payer notification completed date and time are provided, the system sets the rejected 835 state to "closed".

Primary tables contain data that is used as attributes in other, more complex tables, and are typically populated with codes that translate to descriptions and change infrequently. Developing complicated table maintenance pages for primary tables is rarely cost justified. For the TPN hPay Solution System, primary table maintenance pages will be simple in function and plain in design. A primary table maintenance menu page will display the list of primary tables that can be maintained.

Currently, the list of primary tables is: Provider Card Acceptor Business Codes, Payer Card Acceptor Business Codes, Transmission Reject Reason Codes, 835 Reject Reason Codes, TPN Provider Maintenance File Reject Reason Codes, Provider Member Enrollment Process Steps, and Payer Member Enrollment Process Steps.

The following paragraphs relate to data archival and retrieval. All data will be retained in the on-line databases according to the following schedule: transmission and 835 data for 12 months from the Settlement Date; Payer Member Profile data for 12 months from termination; Provider Member Profile data for 12 months from termination; and Provider Fee data for 12 months from the Settlement Date.

For the Beta Release, the TPN hPay Solution System does not need any automatic archiving or retrieval functionality since the Beta Release will be enhanced by further Releases before any data approaches a 12-month aging. However, the TPN hPay Solution System must accommodate the potential volumes associated with 12 months of online accessible data.

The following paragraphs relate to transaction accounting.

The purpose of Transaction Accounting is to be able to identify and track the processing route of each Transmission and each 835 from initial receipt from the VISA DPS ePay System through the various states on to receipt of the final payment to the Provider Member. This function is performed at a summary level and a detail level. The wholesale reporting of the state, disposition, quantity and destination of Transmissions daily and over a finite period of time will be accomplished by way of static and ad hoc reports. For the static reporting, the following reports will be generated for the TPN management team at the completion of a processing day, signaled by the completion of the processing of the daily TPN 835 Fee File from the VISA DPS ePay System: Transmissions Received Today and their Initial Status; Transmissions In Process Today and their Status Change; End-of-Day Transmission Status Summary; 835s Received Today and their Initial Status; 835s In Process Today and their Status Change; End-of-Day 835 Status Summary; Returns Received Today and their Initial Status; Returns In Process Today and their Status Change; End-of-Day Return Status Summary; Fees Reported by VISA DPS Today; and Fees Anticipated Today.

As TPN further develops its internal processes and procedures for financial accounting, transaction accounting and Returns processing, the inventory of static reports will evolve.

The ad hoc reporting tool will be used to generate ad hoc reports.

The Transaction Detail Report lays out the processing history of a specific Transmission from its arrival at VISA DPS from the Payer Member until the time of the Report. At the Transmission level it details the dates/times the Transmission arrived at VISA DPS, arrived at the TPN hPay Solution System, moved to each Transmission state and any other pertinent information. At the 835 level, it details the dates/times the 835 moved to each 835 state and the history of all the EFTs generated from the 835 including any Returns, if appropriate. Because a Transmission can contain a very large number of 835s, the Transaction Detail report can be very large, very long and very tedious to analyze. Therefore, the Transaction Detail report should be used sparingly and only to pursue a specific issue about a specific Transmission.

The following paragraphs relate to the solution system architecture.

The Solution Provider will be expected to recommend specific hardware and software components as part of their solution for the TPN hPay Solution System.

All components must be manufactured by brand name, reputable OEM's with a history in the specific component and a strategy for remaining a viable on-going concern. TPN cannot and will not risk the stability of the TPN hPay Solution System on leading edge, unproven technology manufactured by under funded or financially troubled companies.

The chosen hardware platforms (e.g. servers, data storage devices) should be reliable, expandable, maintainable and fast. As the volume of data passed from Payer to VISA DPS to TPN to Provider expands, the capacity of the hardware platforms must also expand through the timely addition of new components, not the replacement of existing components. Expansion must be based on leveraging existing capabilities. Cost details must be provided for all recommended components, including initial purchase cost and projected maintenance costs.

The chosen system software components (e.g. operating system, import/export server, database server, web application server, email server) should be reliable, expandable, maintainable and fast. As the volume of data passed from Payer to VISA DPS to TPN to Provider expands, the system software tool must complement hardware expansion without either adding new components or replacing existing components. Expansion must be based on leveraging existing capabilities. In addition, the following functional areas may require the acquisition of third party software: Data import/export, Email, and Brochure Site content management.

TPN prefers to stay within the Microsoft family of product offerings, Microsoft Logo-Certified software and hardware, and Microsoft Certified Solution Providers.

The TPN hPay Solution System will be compatible with Internet Explorer 4.0 and later, and Netscape 4.0 and later.

The Solution Provider will create the graphical design of the TPN hPay Brochure Web Site using a mutually agreed upon method to ensure that the site keeps the look and feel of the TPN hPay Solution System. The site will incorporate images and branding created by TPN's marketing team.

The TPN hPay Solution System databases will be designed as fully normalized relational data models and implemented using a mature relational data base engine.

An ad hoc reporting tool is needed to support the currently unknown but foreseen future needs of TPN's management team for reports and information. Although most relational data base engines include an ad hoc reporting capability, not all do. The ad hoc reporting tool needs to be SQL based.

Security is highly important to TPN. The TPN hPay Solution System must conform to all requirements of the Health Insurance Portability and Accountability Act of 1996 (HIPAA). While the HIPAA requirements are still being studied and argued, and while TPN has not fully identified the extent to which the HIPAA requirements must be implemented, the following requirements are known now.

All communications between an end-user and the TPN hpay Solution System that occur over the public Internet must be encrypted.

Users must be authenticated.

All communications between the TPN hpay Solution System and the VISA DPS ePay System will be over a dedicated circuit and will use "VISA's standard Cisco router-based encryption technology." TPN has the responsibility of procuring and installing this secured circuit.

TPN is developing a "Privacy and Security Policy" whose goal is "to keep health care claim payment financial information secure and confidential." While the Policy is still under development, the TPN hPay Solution System must support the Policy's Objectives and must comply and conform with all the Rules and Regulations.

The Federal Register/Volume 63, Number 155 (Appendix I) details on pages 43242 through 43280 a "checklist" of the Requirements and suggested Implementations in the following areas: Administrative Procedures To Guard Data Integrity, Confidentiality, and Availability; Physical Safeguards to Guard Data Integrity, Confidentiality and Availability; Technical Security Services to Guard Data Integrity, Confidentiality and Availability; Technical Security Mechanisms To Guard Against Unauthorized Access To Data That Is Transmitted Over A Communications Network; and User Authentication.

Implementation requires administrative, educational, physical, or facility-related procedures, methodologies and technologies that must be addressed as part of the TPN hPay Solution System: Access authorization, Access establishment, Access modification, Documentation, Hardware/software installation & maintenance review and testing for security features, Security testing, Virus checking, Security incident report procedures, Context-based access control, Role-based access control, User-based access control, Encryption, Automatic logoff, Password, PIN, Telephone/fax callback, and Unique user identification.

The set of databases within the TPN hPay Solution System manage the entities, the relationships among entities, and the attributes of those entities and those relationships. The following Draft Data Relationship Diagram and the Draft Data Relationship Chart illustrate the major relationships among major entities and forms a launching point for the relational database design.

Figure 24:
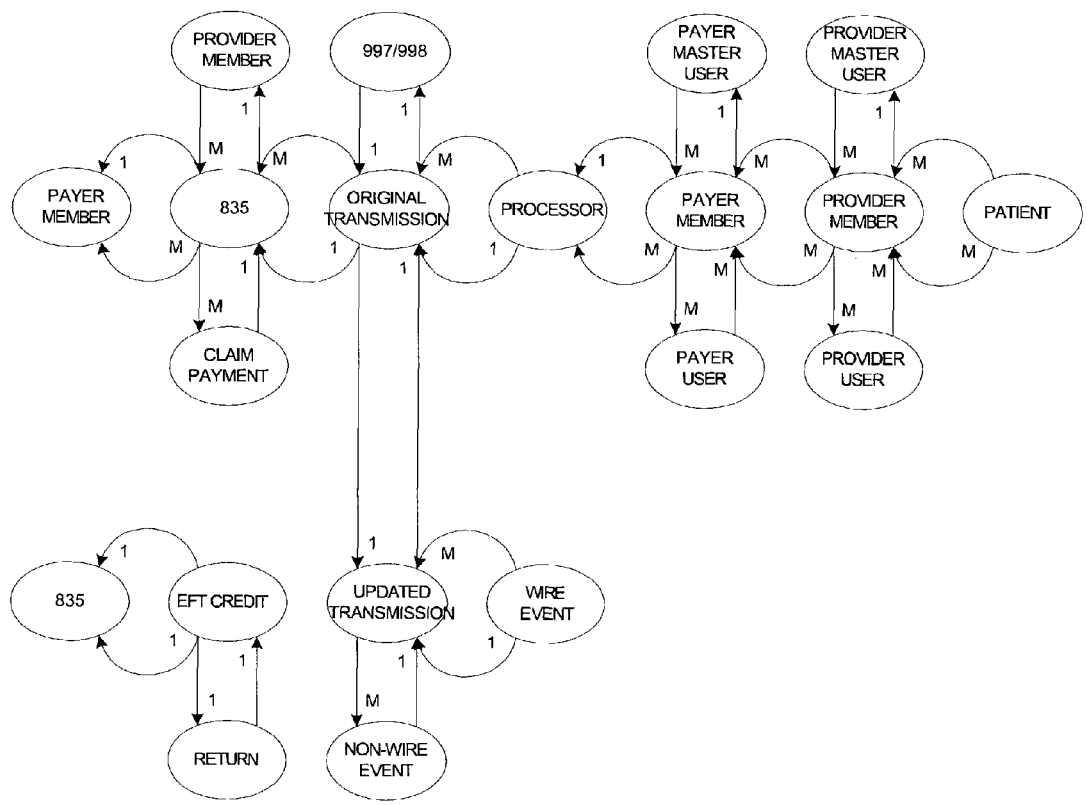

FIG. 24 is a TPN Data Relationship diagram.

On the Data Relationship Diagram, an Entity is represented by an oval. A Relationship between two Entities is represented by a pair of arrows and must be a one-to-one, one-to-many, or many-to-many.

FIG. 25 is a Draft Data Relationship Chart that details the Relationships

Although certain specific exemplary embodiments are described above in order to illustrate the invention, the invention is not limited to the specific embodiments.

For example, in accordance with another embodiment, a patient's account or accounts are managed so that at the time of delivery of health care service an estimated sum for the patient responsibility portion is held in suspense in the patient's account or accounts and the sum is released to pay the patient responsibility portion of the claim after adjudication, without use of a debit card.

In accordance with another embodiment, a patient's tax-advantaged or other accounts are managed so that payment of a patient responsibility portion is authorized at the time of delivery of health care service where the patient is insured under a defined contribution health plan or a high deductible health plan.

In accordance with another embodiment, a discount health care card is used. Due to the high cost of medical insurance, there are many patients who cannot afford health insurance and are therefore uninsured. Discounted health care for qualified patients would help solve the problem but determination of eligibility for a discount at the time of delivery of service presents difficulties. In this embodiment of the invention, a discount health care card is used to establish eligibility at the time of delivery of medical care and to authorize payment.

In accordance with another embodiment, a debit card is used in place of food stamps under Medi-Cal or other state program, to provide eligibility authentication at the time of purchase and to prevent fraud in the sale or use of food stamps.

Accordingly, various modifications, adaptations, and combinations of various features of the described embodiments can be practiced without departing from the scope of the invention as set forth in the following claims.

What is claimed is:

1. A computer-implemented method comprising:
   prior to an adjudication of a health care claim by an insurer for a health care service rendered by a health care provider:
      receiving a first transmission, at a computing device of a processor within a payment processing system, including information about the health care service, wherein the processor processes a transaction within the payment processing system between a holder of an account and a health care provider engaging in the transaction for the health care service upon the account issued to the holder by an issuer;
      using, at the computing device, the received information about the health care service to determine an estimated amount estimating a post adjudication amount that the holder of the account will be responsible to pay after the adjudication; and
      sending, at the computing device, an authorization request to the issuer of the account requesting authorization for the issuer to suspend the estimated amount of funds from an available balance of the account until the health care claim is adjudicated;
   and
   subsequent to the adjudication of the health care claim:
      receiving, at the computing device, a second transmission including the post adjudication amount;
      and
      sending, at the computing device, a third transmission addressed to the issuer requesting the issuer to disburse a payment of the post adjudication amount from the suspended estimated amount of funds to the health care provider.

2. The computer-implemented method as defined in claim 1, further comprising forming, at the computing device, a fourth transmission addressed to an acquirer associated with the health care provider including
   the post adjudication amount.

3. The computer-implemented method as defined in claim 1, further comprising forming, at the computing device, a fourth transmission including data about the adjudicated health care claim for delivery to the health care provider.

4. The computer-implemented method as defined in claim 1, wherein the available balance includes funds available for withdrawal from the account, wherein the account is selected from the group consisting of:
   a credit account;
   a debit account;
   a spending account of a defined benefit health care plan;
   a tax advantaged account pre-allocated for health care payment;
   a medical savings account;
   a flexible spending account;
   a checking account;
   a line of credit; and
   a combination thereof.

5. The computer-implemented method as defined in claim 1, wherein the holder of the account is an insured that receives the health care service from the health care provider.

6. A computer-implemented method comprising:
   prior to an adjudication of a health care claim of a health care provider:
      receiving and storing, at a computing device of a processor within a payment processing system, an authorization request to pay a bill for the health care rendered by the health care provider including:
         an estimated amount estimating a post adjudication amount that a consumer will be responsible to pay after the adjudication; and
         an identifier of the bill usable to distinguish the bill as one in which the estimated amount is to be suspending from an available balance of an account of the consumer until the adjudication, wherein the processor processes a transaction within the payment processing system between the consumer and the health care provider engaging in the transaction for the health care service upon the account issued to the holder by an issuer;
      forming, at the computing device, a first transmission addressed to the issuer of the account requesting the issuer to suspend the estimated amount such that the estimated amount is pre-allocated for payment of the bill;
   and
   subsequent to the adjudication:
      receiving, at the computing device, a second transmission including the post adjudication amount and the identifier of the bill;
      and
      sending, at the computing device, a third transmission addressed to the issuer requesting the issuer to disburse to the health care provider a payment of the post adjudication amount from the estimated amount that was pre-allocated for the payment of the bill.

7. A computer-implemented method comprising:
   prior to an adjudication of a health care claim for a health care service rendered by a health care provider, forming, at a computing device of the health care provider, a payment authorization request requesting that an issuer suspend an estimated amount of funds from an account of a consumer until a health care claim is adjudicated, wherein:

the estimated amount estimates a post adjudication amount that the consumer is to pay the health care provider for the health care service; and a processor processes a transaction within a payment processing system between the consumer and the health care provider engaging in the transaction for the health care service upon the account that is issued to the consumer by the issuer;

forming, at the computing device, a first transmission, addressed to an insurance company having a responsibility to adjudicate the health care claim, including:

the health care claim; and a request for the insurance company to forward to the processor the post adjudication amount;

and receiving, at the computing device, a notification addressed from the processor that a payment of the post adjudication amount has been disbursed to the health care provider from the suspended estimated amount of funds.

8. The computer-implemented method as defined in claim 7, further comprising receiving, at the computing device, a second transmission addressed from the insurance company including at least one of the following:

the post adjudication amount;

a value for a financial responsibility of the insurance company toward the adjudicated health care claim; and an explanation of benefits related to the health care claim.

9. The computer-implemented method as defined in claim 7, further comprising receiving, at the computing device, a second transmission addressed from an acquirer of the health care provider including a history of funds disbursed to the health care provider.

10. The computer-implemented method as defined in claim 9, further comprising conducting, at the computing device, an audit of a plurality of health care clams including matching a plurality of post adjudication amounts with corresponding estimated amounts.

* * * * *